US010625809B2

(12) United States Patent
Murayama et al.

(10) Patent No.: US 10,625,809 B2
(45) Date of Patent: Apr. 21, 2020

(54) STRADDLED VEHICLE

(71) Applicant: YAMAHA HATSUDOKI KABUSHIKI KAISHA, Iwata-shi, Shizuoka-ken (JP)

(72) Inventors: Yuki Murayama, Iwata (JP); Katsutoshi Satoh, Iwata (JP); Hideki Miura, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 157 days.

(21) Appl. No.: 15/677,201

(22) Filed: Aug. 15, 2017

(65) Prior Publication Data

US 2018/0148122 A1    May 31, 2018

(30) Foreign Application Priority Data

Nov. 28, 2016  (JP) .................................. 2016-230669

(51) Int. Cl.
| *B62K 11/04* | (2006.01) |
| *B62K 19/32* | (2006.01) |
| *B62K 19/02* | (2006.01) |
| *B62J 35/00* | (2006.01) |
| *B62J 17/00* | (2020.01) |

(52) U.S. Cl.
CPC .............. *B62K 11/04* (2013.01); *B62K 19/32* (2013.01); *B62J 17/00* (2013.01); *B62J 35/00* (2013.01); *B62K 19/02* (2013.01)

(58) Field of Classification Search
CPC ........ B62K 11/04; B62K 11/02; B62K 19/02; B62K 19/00; B62K 19/18
See application file for complete search history.

(56) References Cited

U.S. PATENT DOCUMENTS

| 5,261,504 | A  | * | 11/1993 | Katsura  | B62K 11/04 180/219 |
| 6,352,132 | B1 | * | 3/2002  | Horii    | B62K 11/04 180/229 |
| 6,695,089 | B2 | * | 2/2004  | Adachi   | B62K 11/04 180/219 |
| 7,316,410 | B2 | * | 1/2008  | Ogura    | B62K 19/00 280/274 |
| 7,360,619 | B2 | * | 4/2008  | Adachi   | B62K 11/04 180/219 |
| 7,644,795 | B2 | * | 1/2010  | Kawamura | B62K 11/04 180/219 |

(Continued)

FOREIGN PATENT DOCUMENTS

WO   WO-2008/059932 A1   5/2008

*Primary Examiner* — Joseph M Rocca
*Assistant Examiner* — Michael R Stabley
(74) *Attorney, Agent, or Firm* — Rabin & Berdo, P.C.

(57) ABSTRACT

A straddled vehicle includes a cross frame connected to a left main frame and a right main frame. As the vehicle is seen from the side, a centroid of a central cross section in a vehicle width direction of the cross frame is located within an area that is delimited by an upper extension obtained by extending rearward an upper outline of the left connecting frame, a lower extension obtained by extending rearward a lower outline of the left connecting frame, an upper outline of the left main frame and a lower outline of the left main frame.

10 Claims, 17 Drawing Sheets

(56) References Cited

U.S. PATENT DOCUMENTS

| | | | | |
|---|---|---|---|---|
| 7,694,985 | B2* | 4/2010 | Hoshi | B62K 19/12 |
| | | | | 280/274 |
| 7,699,132 | B2* | 4/2010 | Adachi | B62K 11/04 |
| | | | | 180/219 |
| 8,157,041 | B2* | 4/2012 | Kawai | B62K 11/04 |
| | | | | 180/68.1 |
| 8,245,672 | B2* | 8/2012 | Yokoi | B62K 11/04 |
| | | | | 123/193.2 |
| 8,272,656 | B2* | 9/2012 | Katsura | B62K 11/04 |
| | | | | 280/274 |
| 8,678,485 | B2* | 3/2014 | Keisuke | B62K 19/06 |
| | | | | 180/219 |
| 8,746,389 | B2* | 6/2014 | Oe | B62K 11/04 |
| | | | | 180/219 |
| 8,770,332 | B2* | 7/2014 | Hirano | B62K 11/04 |
| | | | | 180/219 |
| 9,150,101 | B2* | 10/2015 | Iida | B60K 15/07 |
| 9,272,747 | B2* | 3/2016 | Hirayama | B62K 11/04 |
| 9,308,958 | B2* | 4/2016 | Naruoka | B62M 7/02 |
| 9,381,969 | B2* | 7/2016 | Toda | B62K 19/12 |
| 9,428,238 | B2* | 8/2016 | Ishida | B62K 19/04 |
| 2009/0320785 | A1 | 12/2009 | Yokoi et al. | |
| 2016/0177807 | A1* | 6/2016 | Tanaka | F01P 3/18 |
| | | | | 123/41.01 |
| 2016/0200391 | A1* | 7/2016 | Ishida | B62K 25/283 |
| | | | | 180/227 |
| 2016/0244116 | A1* | 8/2016 | Komatsu | B62J 23/00 |
| 2016/0264205 | A1* | 9/2016 | Ishii | B62K 11/04 |
| 2016/0264206 | A1* | 9/2016 | Ishii | B62H 1/00 |
| 2016/0288858 | A1* | 10/2016 | Tada | B62K 11/04 |

\* cited by examiner

STRADDLED VEHICLE

CROSS-REFERENCE TO RELATED APPLICATIONS

This application claims the benefit of priority to Japanese Patent Application No. 2016-230669 filed on Nov. 28, 2016. The entire contents of this application are hereby incorporated herein by reference.

BACKGROUND OF THE INVENTION

Field of the Invention

The present invention relates to a straddled vehicle.

Description of the Related Art

A motorcycle has been known in the art that includes a head pipe 101, a left and a right main frame 102 extending rearward from the head pipe 101, a down frame 103 placed below the main frame 102 and extending rearward from the head pipe 101, a left and a right connecting frame 104 whose front end portions are connected to the down frame 103 and whose rear end portions are connected to the left and right main frame 102, and a cross frame 105 extending in the vehicle width direction and connected to the left main frame 102 and the right main frame 102, as shown in FIG. 17, for example. The upper end portion of a rear cushion unit (not shown) is supported on the cross frame 105 via a bracket 106 therebetween. Note that International Publication WO2008/059932 describes a motorcycle having a similar configuration to such a configuration.

With such a motorcycle, in order to improve the comfort when running fast on a bad road, for example, it is preferable to minimize the amount of energy in the pitching direction from the road surface to be transmitted to the rider and to maximize the amount of time over which the tires are in contact with the road surface.

With the motorcycle shown in FIG. 17, the cross frame 105 is placed at a relatively low position. Therefore, the position of the upper end portion of the rear cushion unit tends to be low. Now, in order to ensure the minimum ground clearance, there is a limit on lowering the position of the lower end portion of the rear cushion unit. When the upper end portion of the rear cushion unit is low, the rear cushion unit needs to be installed in an attitude that is substantially inclined from the vertical line or the stroke of the rear cushion unit needs to be limited, in order to ensure the minimum ground clearance. As a result, the upward force that is received from the road surface by the rear wheel is unlikely to be absorbed directly by the rear cushion unit. Therefore, with the motorcycle described above, there is room for improvement regarding increasing the amount of time over which the tires are in contact with the road surface when running fast on a bad road, for example.

On the other hand, when a cross frame 105B is placed at a relatively high position as indicated by reference sign 105B in FIG. 17, the distance between the head pipe 101 and the cross frame 105B is short. Therefore, when a shock is applied onto the head pipe 101 from the front, the main frame 102 is unlikely to be bent left and right. Thus, a shock absorbing effect from the bending of the main frame 102 is unlikely to be realized. Therefore, when the cross frame 105B is placed at a high position, the energy in the pitching direction from the road surface is likely to be transmitted to the rider when running fast on a bad road, for example.

SUMMARY OF THE INVENTION

It is an object of the present invention, which has been made in order to solve the problem, to provide a straddled vehicle, with which even when running fast on a bad road, the energy in the pitching direction from the road surface is unlikely to be transmitted to the rider and the amount of time over which the tires are in contact with the road surface is long.

A straddled vehicle according to the present invention includes a head pipe, a left main frame, a right main frame, a down frame, a left lower frame, a right lower frame, a left connecting frame, a right connecting frame, a cross frame, and a rear cushion unit. The left main frame is placed leftward of a vehicle center line, the left main frame including a first connecting portion connected to the head pipe, a first front-rear extending portion extending rearward from the first connecting portion, and a first up-down extending portion extending downward from a rear end of the first front-rear extending portion. The right main frame is placed rightward of the vehicle center line, the right main frame including a second connecting portion connected to the head pipe, a second front-rear extending portion extending rearward from the second connecting portion, and a second up-down extending portion extending downward from a rear end of the second front-rear extending portion. The down frame includes a third connecting portion connected to a portion of the head pipe that is below the first connecting portion and the second connecting portion, and a third up-down extending portion extending downward from the third connecting portion. The left lower frame is connected to a lower end of the third up-down extending portion of the down frame and a lower end of the first up-down extending portion of the left main frame. The right lower frame is connected to a lower end of the third up-down extending portion of the down frame and a lower end of the second up-down extending portion of the right main frame. A front end portion of the left connecting frame is connected to the down frame and a rear end portion of the left connecting frame is connected to the first front-rear extending portion of the left main frame. A front end portion of the right connecting frame is connected to the down frame and a rear end portion of the right connecting frame is connected to the second front-rear extending portion of the right main frame. The cross frame is connected to the left main frame and the right main frame. An upper end portion of the rear cushion unit is pivotally supported on the cross frame. As the vehicle is seen from the side, a centroid of a central cross section in a vehicle width direction of the cross frame is located within an area that is delimited by an upper extension obtained by extending rearward an upper outline of the left connecting frame, a lower extension obtained by extending rearward a lower outline of the left connecting frame, an upper outline of the left main frame and a lower outline of the left main frame, and is located within an area that is delimited by an upper extension obtained by extending rearward an upper outline of the right connecting frame, a lower extension obtained by extending rearward a lower outline of the right connecting frame, an upper outline of the right main frame and a lower outline of the right main frame.

With the straddled vehicle set forth above, as the centroid of the cross frame is located within such an area as described above, the position of the upper end portion of the rear cushion unit is kept at a relatively high position, and a distance is ensured between the head pipe and the cross frame. Therefore, the rear cushion unit does not need to be installed in an attitude that is substantially inclined from the vertical line, and the upward force that is received from the road surface by the rear wheel is likely to be absorbed directly by the rear cushion unit. When a shock is applied onto the head pipe from the front, there is likely to be a shock absorbing effect from the left main frame and the right main frame being bent left and right. Therefore, even when running fast on a bad road, it is possible to reduce the amount of energy in the pitching direction from the road surface to be transmitted to the rider and to increase the amount of time over which the tires are in contact with the road surface.

According to a preferred embodiment of the present invention, $0.8 \times L1 \leq L3 \leq 1.0 \times L1$, where: $L1$ is a distance between a central axis of the head pipe and the centroid of the cross frame; and $L3$ is a distance between a central axis of the head pipe and an intersection point between the upper extension of the left connecting frame and a center line of the left main frame, as the vehicle is seen from the side, or a distance between a central axis of the head pipe and an intersection point between the upper extension of the right connecting frame and a center line of the right main frame, as the vehicle is seen from the side.

According to the embodiment set forth above, the distance between the head pipe and the connecting portion between the left main frame and the left connecting frame, or the distance between the head pipe and the connecting portion between the right main frame and the right connecting frame is relatively long. Therefore, when a shock is applied onto the head pipe from the front, it is possible to sufficiently realize a shock absorbing effect from the left main frame and the right main frame being bent. Therefore, it is possible to sufficiently reduce the amount of energy in the pitching direction from the road surface to be transmitted to the rider.

According to a preferred embodiment of the present invention, $L3 \geq 2 \times L2$, where: $L2$ is a dimension of the head pipe in a central axis direction; and $L3$ is a distance between a central axis of the head pipe and an intersection point between the upper extension of the left connecting frame and a center line of the left main frame, as the vehicle is seen from the side, or a distance between a central axis of the head pipe and an intersection point between the upper extension of the right connecting frame and a center line of the right main frame, as the vehicle is seen from the side.

According to the embodiment set forth above, the distance between the head pipe and the connecting portion between the left main frame and the left connecting frame, or the distance between the head pipe and the connecting portion between the right main frame and the right connecting frame is relatively long. Therefore, when a shock is applied onto the head pipe from the front, it is possible to sufficiently realize a shock absorbing effect from the left main frame and the right main frame being bent. Therefore, it is possible to sufficiently reduce the amount of energy in the pitching direction from the road surface to be transmitted to the rider.

According to a preferred embodiment of the present invention, the left main frame and the right main frame each include a first portion that deviates outward in a vehicle width direction while extending rearward from the head pipe, as the vehicle is seen from above, and a second portion that deviates inward in the vehicle width direction while extending rearward from the first portion, as the vehicle is seen from above; and. At least a portion of the cross frame is connected to the second portion of the left main frame and the second portion of the right main frame.

When a shock is applied onto the head pipe from the front, the first portion is more easily bent than the second portion. Therefore, the first portion is more likely to exert a shock absorbing effect from being bent than the second portion. According to the embodiment set forth above, the cross frame is connected to the second portion, and the first portion is not bound by the cross frame. Therefore, it is possible to sufficiently realize a shock absorbing effect, and it is possible to sufficiently reduce the amount of energy in the pitching direction from the road surface to be transmitted to the rider.

According to a preferred embodiment of the present invention, as the vehicle is seen from the side, a pivotal point of the upper end portion of the rear cushion unit is located within an area between an upper extension obtained by extending rearward an upper outline of the left connecting frame and a lower extension obtained by extending rearward a lower outline of the left connecting frame, and is located within an area between an upper extension obtained by extending rearward an upper outline of the right connecting frame and a lower extension obtained by extending rearward a lower outline of the right connecting frame.

According to the embodiment set forth above, the position of the upper end portion of the rear cushion unit is relatively high. Therefore, the rear cushion unit does not need to be installed in an attitude that is substantially inclined from the vertical line, and the upward force that is received from the road surface by the rear wheel is likely to be absorbed directly by the rear cushion unit. Thus, it is possible to increase the amount of time over which the tires are in contact with the road surface.

According to a preferred embodiment of the present invention, the straddled vehicle includes an engine unit including a crankcase, a cylinder body connected to the crankcase, a cylinder head connected to the cylinder body, and a cylinder head cover connected to the cylinder head, wherein the engine unit is suspended on the left main frame, the right main frame and the down frame. The left connecting frame and the cylinder head cover partially overlap with each other and the right connecting frame and the cylinder head cover partially overlap with each other, as the vehicle is seen from the side.

According to the embodiment set forth above, the left connecting frame and the right connecting frame are located at a relatively high position such that they partially overlap with the cylinder head cover. Since the cross frame is placed so that the centroid is located within the area described above, the cross frame is located at a preferred position such that the upper end portion of the rear cushion unit is located at a relatively high position.

According to a preferred embodiment of the present invention, the straddled vehicle includes a seat frame attached to the cross frame and extending rearward from the cross frame. As the vehicle is seen from the side, a point at which the seat frame is attached to the cross frame is located above the upper extension of the left connecting frame and the upper extension of the right connecting frame.

According to the embodiment set forth above, it is possible to preferably support the seat frame on the cross frame while simultaneously realizing the effect that the rear cushion unit directly absorbs the upward force received from the road surface by the rear wheel and realizing the shock absorbing effect due to the left main frame and the right main frame being bent when a shock is applied onto the head pipe from the front.

According to the present invention, it is possible to provide a straddled vehicle, with which even when running fast on a bad road, the energy in the pitching direction from the road surface is unlikely to be transmitted to the rider and the amount of time over which the tires are in contact with the road surface is long.

DETAILED DESCRIPTION OF THE PREFERRED EMBODIMENTS

Figure 1:
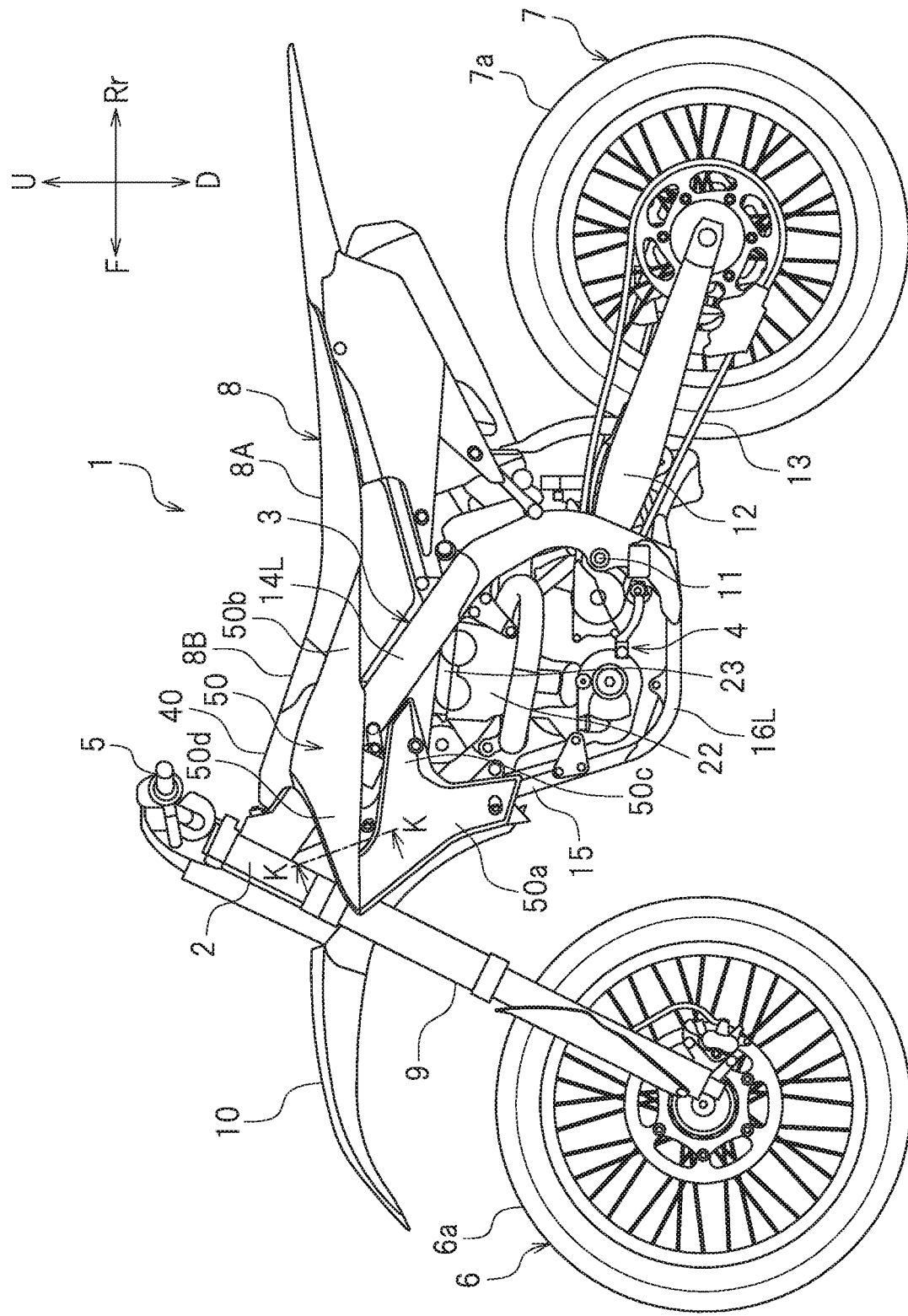
FIG. 1 is a side view of a motorcycle according to one embodiment.

An embodiment of the present invention will now be described with reference to the drawings. FIG. 1 is a side view of a motorcycle 1 according to the embodiment. The motorcycle 1 includes a vehicle body frame 3 including a head pipe 2, an engine unit 4, a handle 5, a front wheel 6, a rear wheel 7, and a seat 8 on which the rider is seated.

The terms front, rear, left, right, up and down, as used in the description below, refer to these directions as seen from the rider while assuming that the motorcycle 1 is standing upright on a horizontal surface with no load thereon. Note that "no load" means that there is no rider on the motorcycle 1 and the motorcycle 1 has no fuel. The designations F, Rr, L, R, U and D, as used in the figures, refer to front, rear, left, right, up and down, respectively.

The term "front" is not limited to the horizontal forward direction, but is inclusive of any inclined direction that is in the range of −45° to +45° with respect to the horizontal forward direction, unless specified otherwise. Similarly, the term "rear" is not limited to the horizontal rearward direction, but is inclusive of any inclined direction that is in the range of −45° to +45° with respect to the horizontal rearward direction. The term "left" is not limited to the leftward direction in the vehicle width direction, but is inclusive of any inclined direction that is in the range of −45° to +45° with respect to that direction. The term "right" is not limited to the rightward direction in the vehicle width direction, but is inclusive of any inclined direction that is in the range of −45° to +45° with respect to that direction. The term "up" is not limited to the vertical upward direction, but is inclusive of any inclined direction that is in the range of −45° to +45° with respect to the vertical upward direction. The term "down" is not limited to the vertical downward direction, but is inclusive of any inclined direction that is in the range of −45° to +45° with respect to the vertical downward direction. In the present specification and claims, the terms "down" and "downward" generally refer to the relationship of an object and the ground, or the surface on which the vehicle, such as the motorcycle, is resting with its wheels or tires on the ground or surface. In other words, the direction of the ground or surface on which the tires are resting relative to an object on the vehicle is generally down or downward relative to the object on the vehicle.

A front portion of an object refers to a portion that is forward of the middle of the object in the vehicle front-rear direction, unless specified otherwise. A rear portion of an object refers to a portion that is rearward of the middle of the object in the vehicle front-rear direction.

A steering shaft (not shown) is supported on the head pipe 2 so that the steering shaft can rotate left and right. The handle 5 is secured on an upper portion of the steering shaft. A front fork 9 is secured on a lower portion of the steering shaft. The front wheel 6 including a tire 6a is supported on a lower portion of the front fork 9. A front fender 10 is placed above the front wheel 6. A rear arm 12 is supported on the vehicle body frame 3 via a pivot shaft 11 so that the rear arm 12 can pivot up and down. The rear wheel 7 including a tire 7a is supported on a rear end portion of the rear arm 12. The engine unit 4 and the rear wheel 7 are linked together via a transmission member 13 such as a chain.

Figure 2:
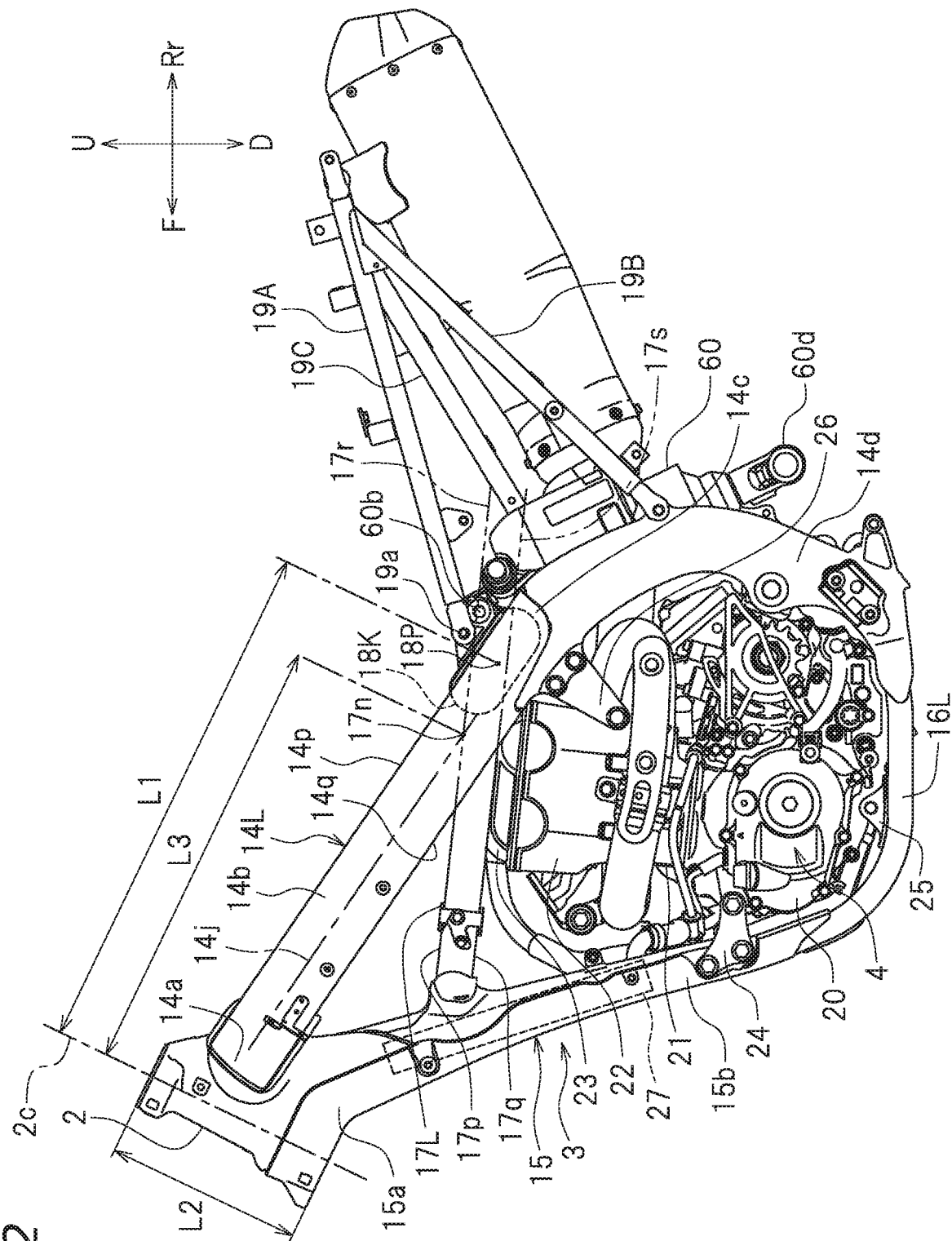
FIG. 2 is a side view of a portion of the motorcycle.
Figure 3:
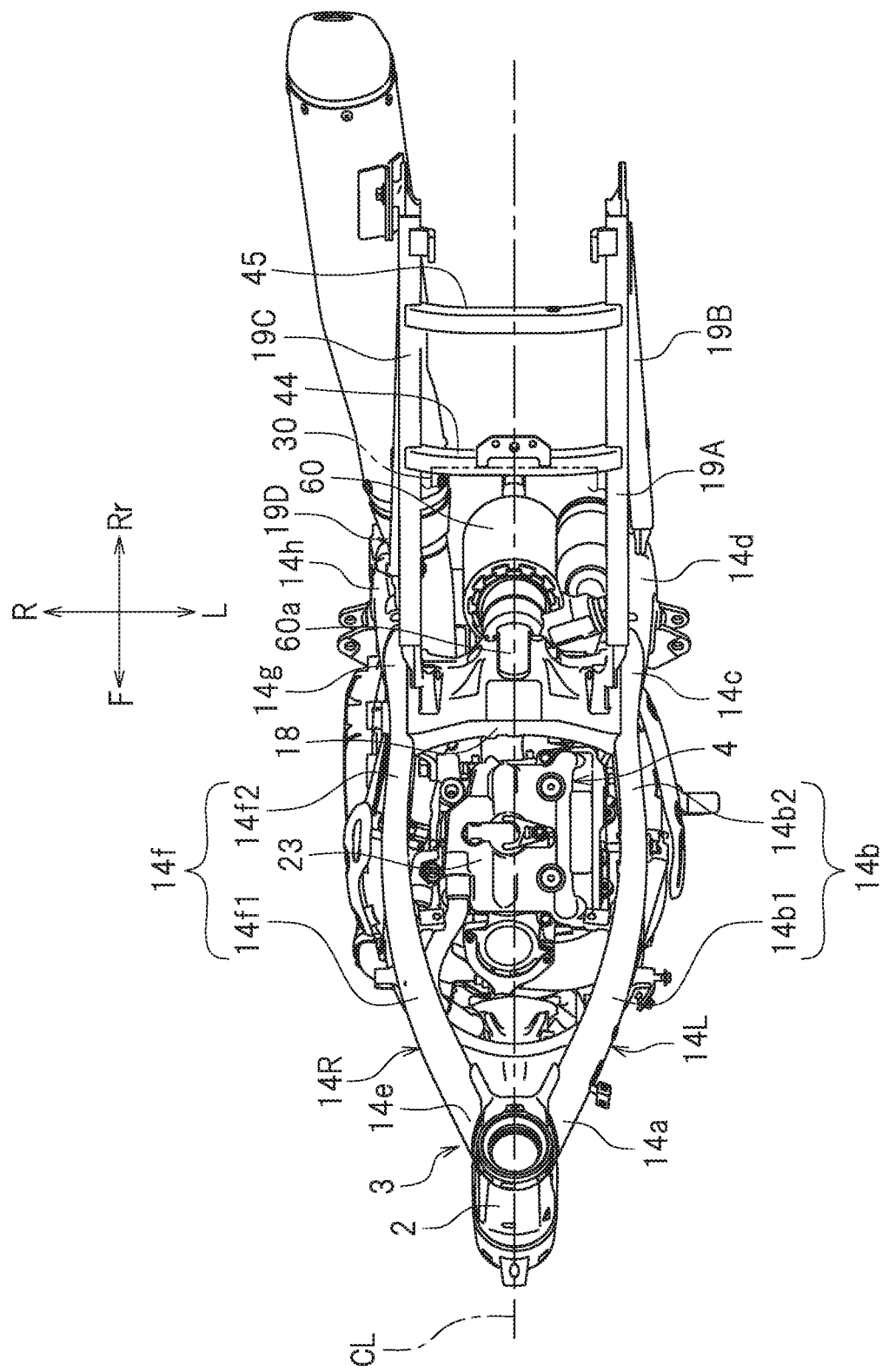
FIG. 3 is a plan view of a portion of the motorcycle.

FIG. 2 is a side view of a portion of the motorcycle 1, and FIG. 3 is a plan view of a portion of the motorcycle 1. The vehicle body frame 3 includes a left main frame 14L and a right main frame 14R each extending rearward from the head pipe 2. The vehicle body frame 3 includes a down frame 15 extending downward from the head pipe 2. The left main frame 14L is placed leftward of the vehicle center line CL, and the right main frame 14R is placed rightward of the vehicle center line CL. The down frame 15 is placed below the left main frame 14L and the right main frame 14R.

The left main frame 14L includes a first connecting portion 14a connected to the head pipe 2, a first front-rear extending portion 14b extending rearward from the first connecting portion 14a, and a first up-down extending portion 14d extending downward from a lower end 14c of the first front-rear extending portion 14b. As shown in FIG. 3, the shapes of the left main frame 14L and the right main frame 14R are in left-right symmetry with each other. The right main frame 14R includes a second connecting portion 14e connected to the head pipe 2, a second front-rear extending portion 14f extending rearward from the second connecting portion 14e, and a second up-down extending portion 14h extending downward from a lower end 14g of the second front-rear extending portion 14f. As shown in FIG. 2, the left main frame 14L has an upper outline 14p and a lower outline 14q, as the vehicle is seen from the side. Although not shown in the figure, the right main frame 14R has a similar upper outline 14p and a similar lower outline 14q. As the vehicle is seen from the side, the upper outline 14p of the left main frame 14L and the upper outline 14p of the right main frame 14R are laid on each other, and the lower outline 14q of the left main frame 14L and the lower outline 14q of the right main frame 14R are laid on each other.

As shown in FIG. 3, the first front-rear extending portion 14*b* of the left main frame 14L includes a first portion 14*b*1 that deviates outward (i.e., leftward) in the vehicle width direction while extending rearward from the head pipe 2, and a second portion 14*b*2 that deviates inward (i.e., rightward) in the vehicle width direction while extending rearward from the first portion 14*b*1. The second front-rear extending portion 14*f* of the right main frame 14R includes a first portion 14*f*1 that deviates outward (i.e., rightward) in the vehicle width direction while extending rearward from the head pipe 2, and a second portion 14*f*2 that deviates inward (i.e., leftward) in the vehicle width direction while extending rearward from the first portion 14*f*1.

As shown in FIG. 2, the down frame 15 includes a third connecting portion 15*a* connected to the head pipe 2, and a third up-down extending portion 15*b* extending downward from the third connecting portion 15*a*. The third connecting portion 15*a* is located below the first connecting portion 14*a* and the second connecting portion 14*e*. As the vehicle is seen from the side, the inclination angle of the down frame 15 with respect to the horizontal line is greater than the inclination angle of the first front-rear extending portion 14*b* of the left main frame 14L with respect to the horizontal line and is greater than the inclination angle of the second front-rear extending portion 14*f* of the right main frame 14R with respect to the horizontal line.

The left main frame 14L and the down frame 15 are linked together via a left connecting frame 17L. Herein, the front end portion of the left connecting frame 17L is connected to the down frame 15, and the rear end portion of the left connecting frame 17L is connected to the first front-rear extending portion 14*b* of the left main frame 14L. Similarly, the right main frame 14R and the down frame 15 are linked together via a right connecting frame 17R. The front end portion of the right connecting frame 17R is connected to the down frame 15, and the rear end portion of the right connecting frame 17R is connected to the second front-rear extending portion 14*f* of the right main frame 14R. The dimension of the left connecting frame 17L in the up-down direction is smaller than the dimension of the left main frame 14L in the up-down direction. The dimension of the right connecting frame 17R in the up-down direction is smaller than the dimension of the right main frame 14R in the up-down direction. The left connecting frame 17L is thinner than the left main frame 14L, and the right connecting frame 17R is thinner than the right main frame 14R.

Figure 5:
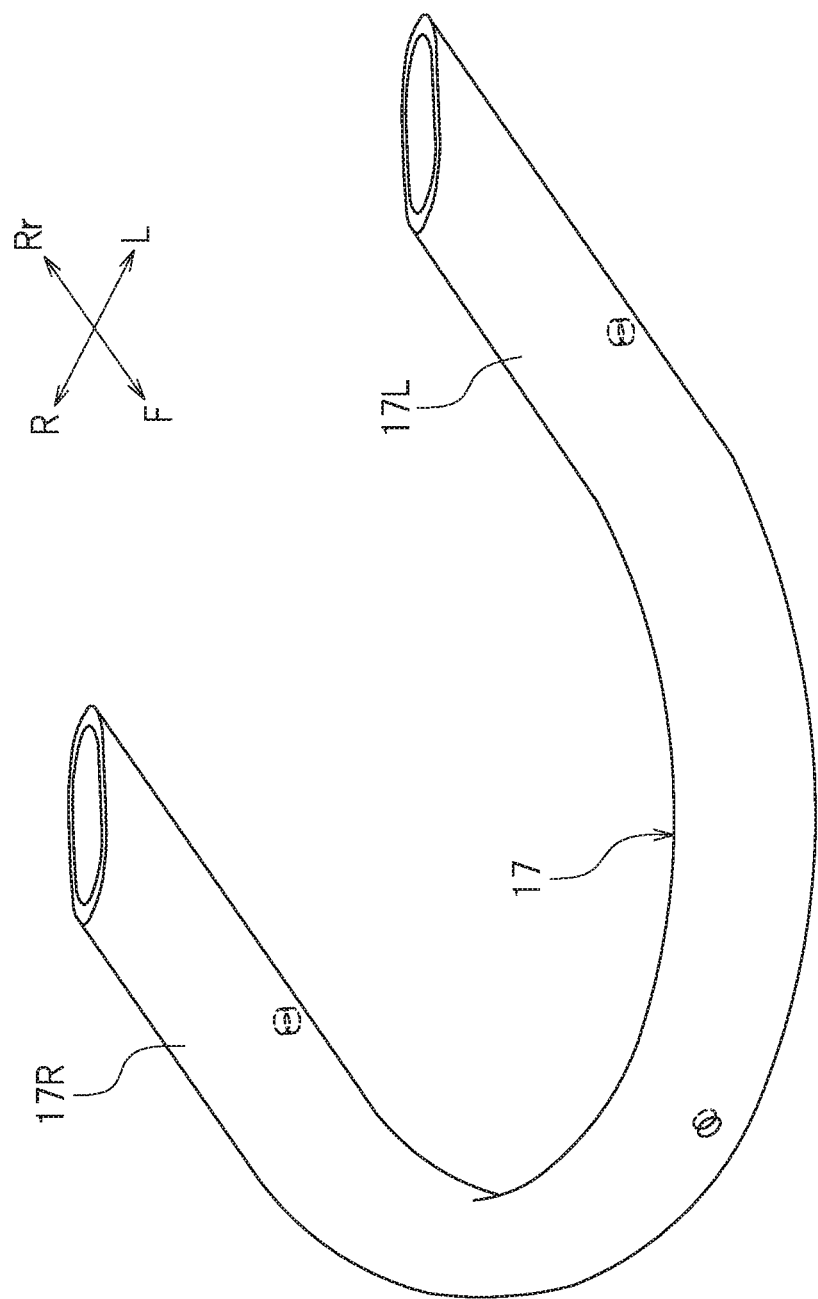
FIG. 5 is a perspective view of a left connecting frame and a right connecting frame.

The left connecting frame 17L and the right connecting frame 17R may be separate from each other or may be an integral piece. The left connecting frame 17L and the right connecting frame 17R are a single U-shaped pipe 17, as shown in FIG. 5. The pipe 17 is welded to the down frame 15. Herein, the left half of the pipe 17 is the left connecting frame 17L, and the right half thereof is the right connecting frame 17R.

Figure 4:
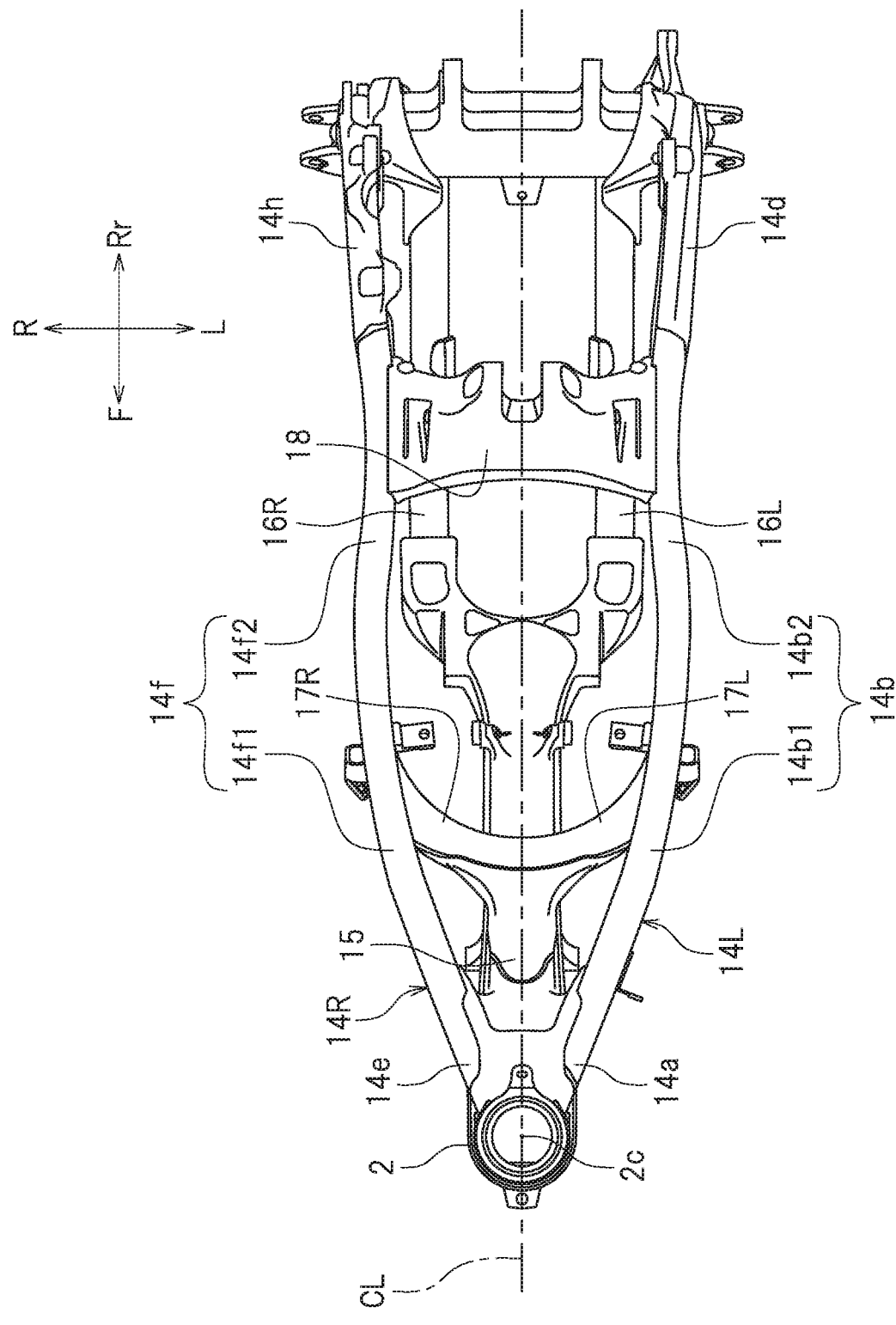
FIG. 4 is a plan view of a vehicle body frame.

As shown in FIG. 4, the first front-rear extending portion 14*b* of the left main frame 14L and the second front-rear extending portion 14*f* of the right main frame 14R are connected together via a cross frame 18. The cross frame 18 extends in the vehicle width direction. The left end portion of the cross frame 18 is connected to the first front-rear extending portion 14*b*, and the right end portion thereof is connected to the second front-rear extending portion 14*f*. Herein, the left end portion of the cross frame 18 is connected to the second portion 14*b*2 of the first front-rear extending portion 14*b*. The right end portion of the cross frame 18 is connected to the second portion 14*f*2 of the second front-rear extending portion 14*f*. The cross frame 18 is shaped so that the dimension thereof in the front-rear direction is larger than the dimension thereof in the up-down direction. Note however that this and the placement of the cross frame 18 are merely illustrative, and embodiments of the present invention are not limited to the illustrated placement of the cross frame 18.

The broken line 18K of FIG. 2 represents a cross section of the cross frame 18 at the center in the vehicle width direction. Note that in the present embodiment, the position of the center of the cross frame 18 in the vehicle width direction coincides with the position of the vehicle center line CL. Note that the vehicle center line CL is a line extending in the vehicle front-rear direction passing through a central axis 2*c* of the head pipe 2 as seen from above. As shown in FIG. 2, as the vehicle is seen from the side, a centroid 18P of the central cross section 18K in the vehicle width direction of the cross frame 18 is located within an area that is delimited by an upper extension 17*r* obtained by extending rearward an upper outline 17*p* of the left connecting frame 17L, a lower extension 17*s* obtained by extending rearward a lower outline 17*q* of the left connecting frame 17L, the upper outline 14*p* of the left main frame 14L and the lower outline 14*q* of the left main frame 14L. Moreover, as the vehicle is seen from the side, the centroid 18P is located within an area that is delimited by the upper extension 17*r* obtained by extending rearward the upper outline 17*p* of the right connecting frame 17R, the lower extension 17*s* obtained by extending rearward the lower outline 17*q* of the right connecting frame 17R, the upper outline 14*p* of the right main frame 14R and the lower outline 14*q* of the right main frame 14R.

In the motorcycle 1 according to the present embodiment, the cross frame 18 is placed at a position relatively far away from the head pipe 2. Embodiments of the invention are not limited to any one distance between the cross frame 18 and the head pipe 2, but the distance L1 between the central axis 2*c* of the head pipe 2 and the centroid 18P of the cross frame 18 is, according to one embodiment, twice or more the dimension L2 of the head pipe 2 in the central axis direction. In one embodiment, L1 may be two to three times L2.

In the motorcycle 1, a portion where the left connecting frame 17L and the left main frame 14L are connected together and a portion where the right connecting frame 17R and the right main frame 14R are connected together are placed at positions relatively far away from the head pipe 2. Herein, as the vehicle is seen from the side, the distance L3 between the intersection point 17*n* between the upper extension 17*r* of the left connecting frame 17L and the central line 14*j* of the left main frame 14L and the central axis 2*c* of the head pipe 2 is twice or more the dimension L2 of the head pipe 2 in the central axis direction. That is, L3≥2×L2. Similarly, as the vehicle is seen from the side, the distance L3 between the intersection point 17*n* between the upper extension 17*r* of the right connecting frame 17R and the central line 14*j* of the right main frame 14R and the central axis 2*c* of the head pipe 2 is twice or more the dimension L2 of the head pipe 2 in the central axis direction. That is, L3≥2×L2. The dimension L3 is set to a value close to the dimension L1. Herein, L3 is set to be 0.8 to 1 time L1. 0.8×L1≤L3≤1.0×L1. Note however that the relationship between L1 to L3 described above is illustrative, and embodiments of the invention are not limited to the above relationship.

The vehicle body frame 3 includes left and right upper seat frames 19A and 19C and left and right lower seat frames 19B and 19D (see FIG. 3) supporting the seat 8. As shown in FIG. 3, the front end portions of the left and right upper seat frames 19A and 19C are connected to the cross frame 18. The upper seat frames 19A and 19C extend rearward from the cross frame 18. As the vehicle is seen from the side, points 19a at which the upper seat frames 19A and 19C are attached to the cross frame 18 are located above the upper extension 17r of the left connecting frame 17L and the upper extension 17r of the right connecting frame 17R. Note however that embodiments of the invention are not limited to the illustrated position of the point of attachment 19a. The front end portion of the left lower seat frame 19B is connected to the first up-down extending portion 14d of the left main frame 14L. The rear end portion of the left upper seat frame 19A and the rear end portion of the left lower seat frame 19B are connected to each other. The front end portion of the right upper seat frame 19C is connected to the second up-down extending portion 14h of the right main frame 14R. The rear end portion of the right upper seat frame 19C and the rear end portion of the right lower seat frame 19D are connected together.

As shown in FIG. 3, a rear cross frame 44 and a rear cross frame 45 located rearward of the rear cross frame 44 are connected to the left upper seat frame 19A and the right upper seat frame 19C.

As shown in FIG. 2 and FIG. 4, the vehicle body frame 3 includes a left lower frame 16L that connects together the down frame 15 and the first up-down extending portion 14d of the left main frame 14L, and a right lower frame 16R that connects together the down frame 15 and the second up-down extending portion 14h of the right main frame 14R. The front end portion of the left lower frame 16L and the front end portion of the right lower frame 16R are connected to the lower end portion of the third up-down extending portion 15b of the down frame 15. The rear end portion of the left lower frame 16L is connected to the lower end portion of the first up-down extending portion 14d. The rear end portion of the right lower frame 16R is connected to the lower end portion of the second up-down extending portion 14h.

As shown in FIG. 3, an upper end portion 60a of a rear cushion unit 60 is supported on the cross frame 18. The upper end portion 60a of the rear cushion unit 60 is pivotally supported on the central portion of the cross frame 18 in the vehicle width direction. In FIG. 2, reference sign 60b represents the pivotal point of the upper end portion 60a of the rear cushion unit 60. Reference sign 60d represents the lower end portion of the rear cushion unit 60. As the vehicle is seen from the side, the pivotal point 60b is located between the upper extension 17r obtained by extending rearward the upper outline 17p of the left connecting frame 17L and the lower extension 17s obtained by extending rearward the lower outline 17q of the left connecting frame 17L. Although not shown in the figure, the pivotal point 60b is located between the upper extension 17r obtained by extending rearward the upper outline 17p of the right connecting frame 17R and the lower extension 17s obtained by extending rearward the lower outline 17q of the right connecting frame 17R, as the vehicle is seen from the side. The pivotal point 60b is placed upward and rearward of the upper outline 14p of the left main frame 14L and the right main frame 14R, as the vehicle is seen from the side, in the present embodiment, but embodiments of the invention are not limited to the illustrated placement of the pivotal point 60b. In the present specification and claims, the rear cushion unit 60 may be a shock absorber or any device configured to absorb shock or cushion a force received from the rear wheel 7 so that the vehicle body frame 3 does not receive the full force of a shock, bump, or jolt received from the rear wheel 7. Embodiments of the present invention include a rear cushion unit 60 embodied in a hydraulic shock absorber, spring-implemented shock absorber, or any other shock absorbing device.

The engine unit 4 includes a crankcase 20, a cylinder body 21, a cylinder head 22 and a cylinder head cover 23. The cylinder body 21 is placed on top of the crankcase 20, the cylinder head 22 is placed on top of the cylinder body 21, and the cylinder head cover 23 is placed on top of the cylinder head 22. Although not shown in the figure, the crank shaft of the internal combustion engine is accommodated inside the crankcase 20. A cylinder that slidably accommodates a piston therein is formed inside the cylinder body 21. An intake port and an exhaust port are formed in the cylinder head 22, and an intake cam and an exhaust cam are accommodated in the cylinder head 22. The cylinder head cover 23 is connected to the upper portion of the cylinder head 22.

The engine unit 4 is suspended on the vehicle body frame 3. A portion of the engine unit 4 is supported on the down frame 15 via a bracket 24. Another portion of the engine unit 4 is supported on the lower frames 16L and 16R via brackets 25. Another portion of the engine unit 4 is supported on the main frames 14L and 14R via brackets 26.

As shown in FIG. 2, the left connecting frame 17L and the cylinder head cover 23 partially overlap with each other, as the vehicle is seen from the side. Similarly, the right connecting frame 17R and the cylinder head cover 23 partially overlap with each other, as the vehicle is seen from the side.

The internal combustion engine of the engine unit 4 is a water-cooled internal combustion engine. The motorcycle 1 includes a radiator 27. The radiator 27 serves to radiate heat of the cooling water of the internal combustion engine. The radiator 27 is supported on the vehicle body frame 3. The radiator 27 is secured on the down frame 15. The radiator 27 is placed forward of the engine unit 4. The radiator 27 is placed below the head pipe 2.

Figure 6:
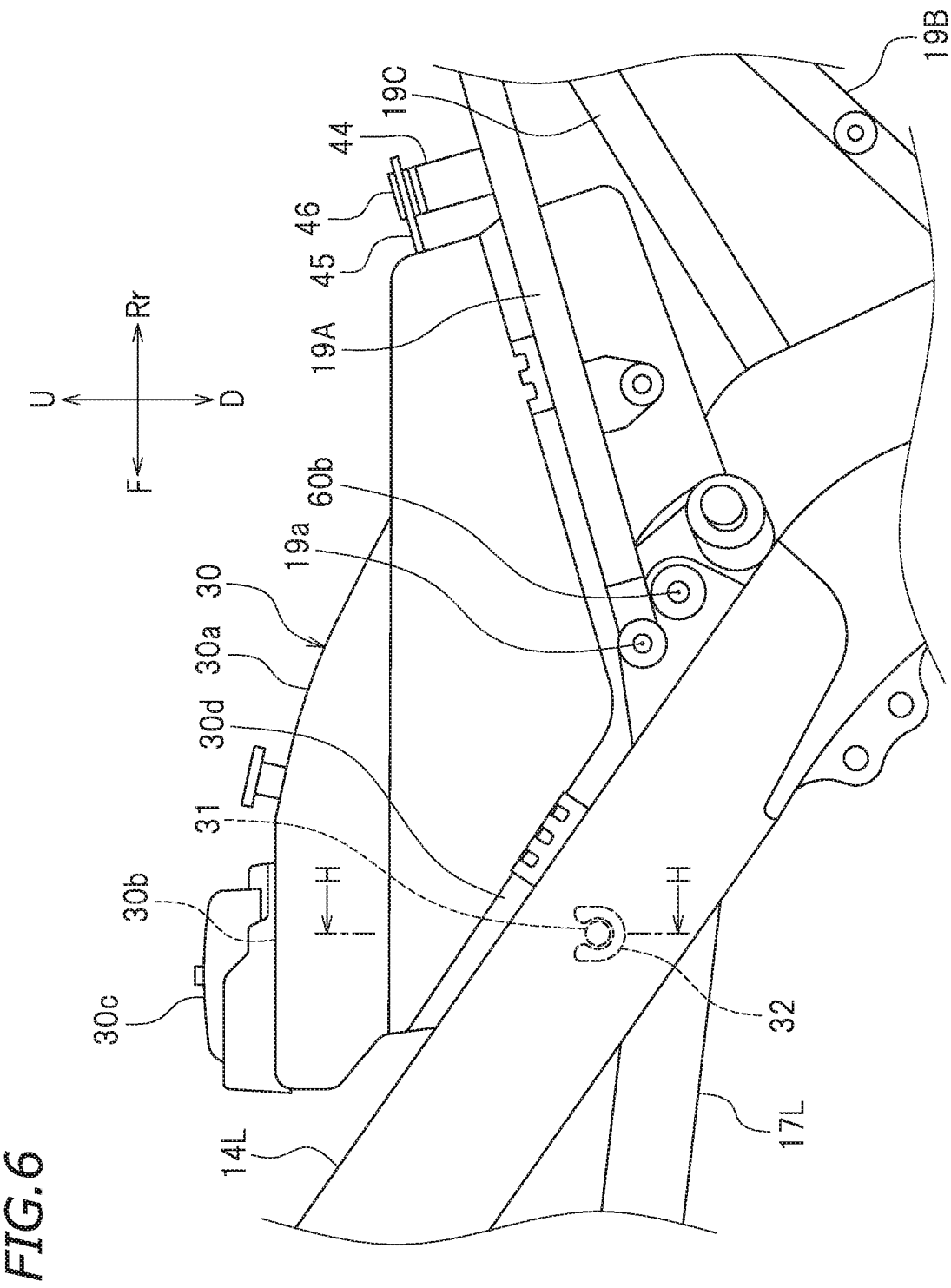
FIG. 6 is a side view of a fuel tank and a portion of the vehicle body frame.
Figure 7:
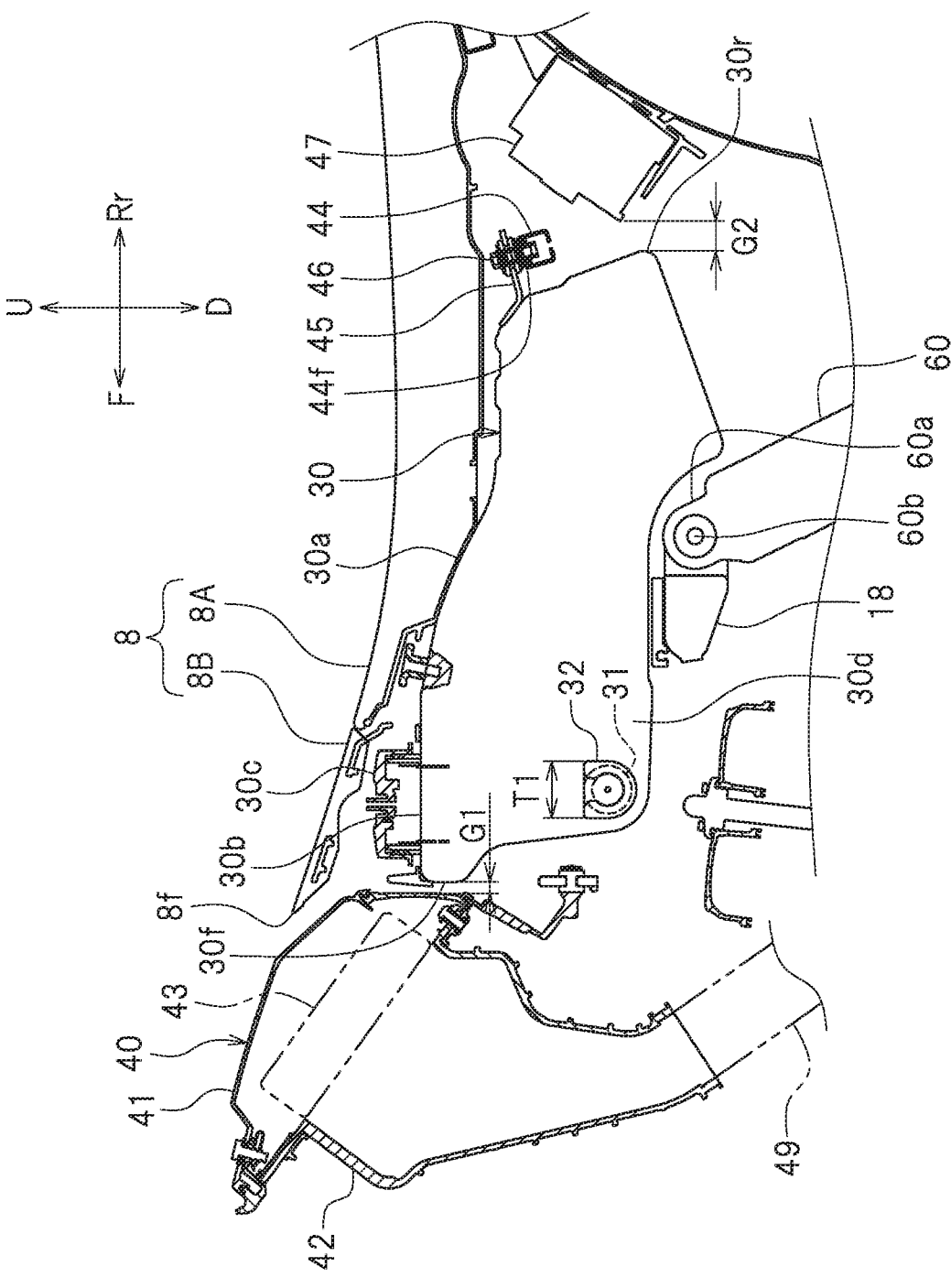
FIG. 7 is a side view schematically showing a portion of the motorcycle.

As shown in FIG. 6, the motorcycle 1 includes a fuel tank 30. Fuel to be supplied to the internal combustion engine of the engine unit 4 is stored in the fuel tank 30. As shown in FIG. 7, the fuel tank 30 includes a tank body 30a, and a cap 30c attached to an oil fill port 30b in the upper portion of the tank body 30a. Embodiments of the invention are not limited to only the illustrated position of the cap 30c, but, according to one embodiment, the cap 30c is placed in the front portion of the tank body 30a. The tank body 30a includes a left and a right side wall 30d. Note that the shape of the fuel tank 30 is simplified in FIG. 7.

Figure 8:
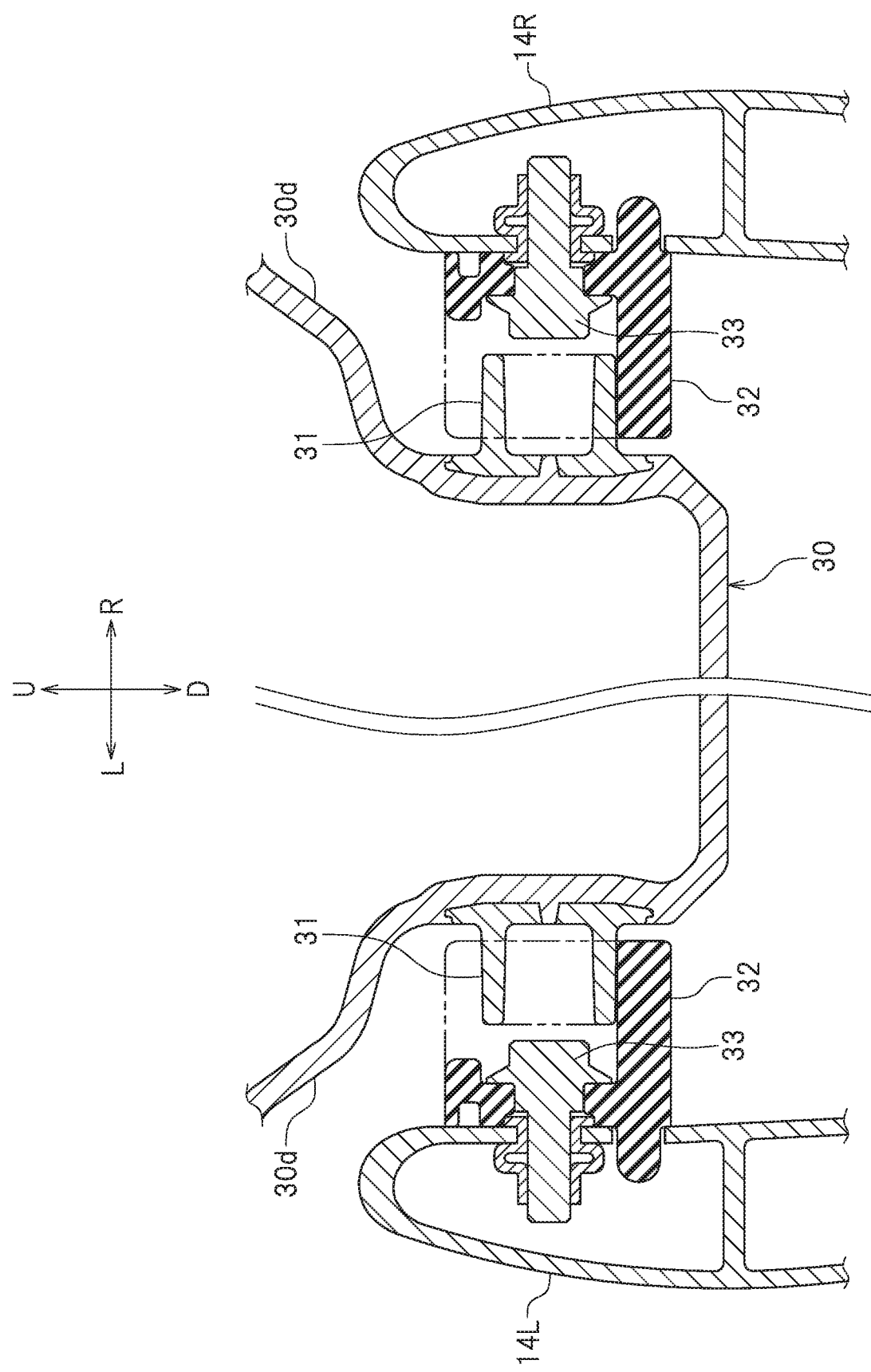
FIG. 8 is a cross-sectional view taken along line H-H of FIG. 6.

FIG. 8 shows a cross section taken along line H-H of FIG. 6. Note however that the central portion in the vehicle width direction is not shown. As shown in FIG. 8, the left and right side walls 30d are each provided with a protruding member 31 extending sideways. While the protruding member 31 is herein formed by a cylindrical member, the present invention is not limited to a cylindrical shape. Although the protruding member 31 may be assembled onto the side wall 30d via a bolt, or the like, it is herein integral with the side wall 30d. The protruding member 31 and the side wall 30d are made of a resin and are integral together. As shown in FIG. 7, the protruding member 31 is provided in the front portion of the side wall 30d. The protruding member 31 is placed directly below the cap 30c, as the vehicle is seen from the side. Note however that embodiments of the invention are not limited to any one position of the protruding member 31.

Figure 9:
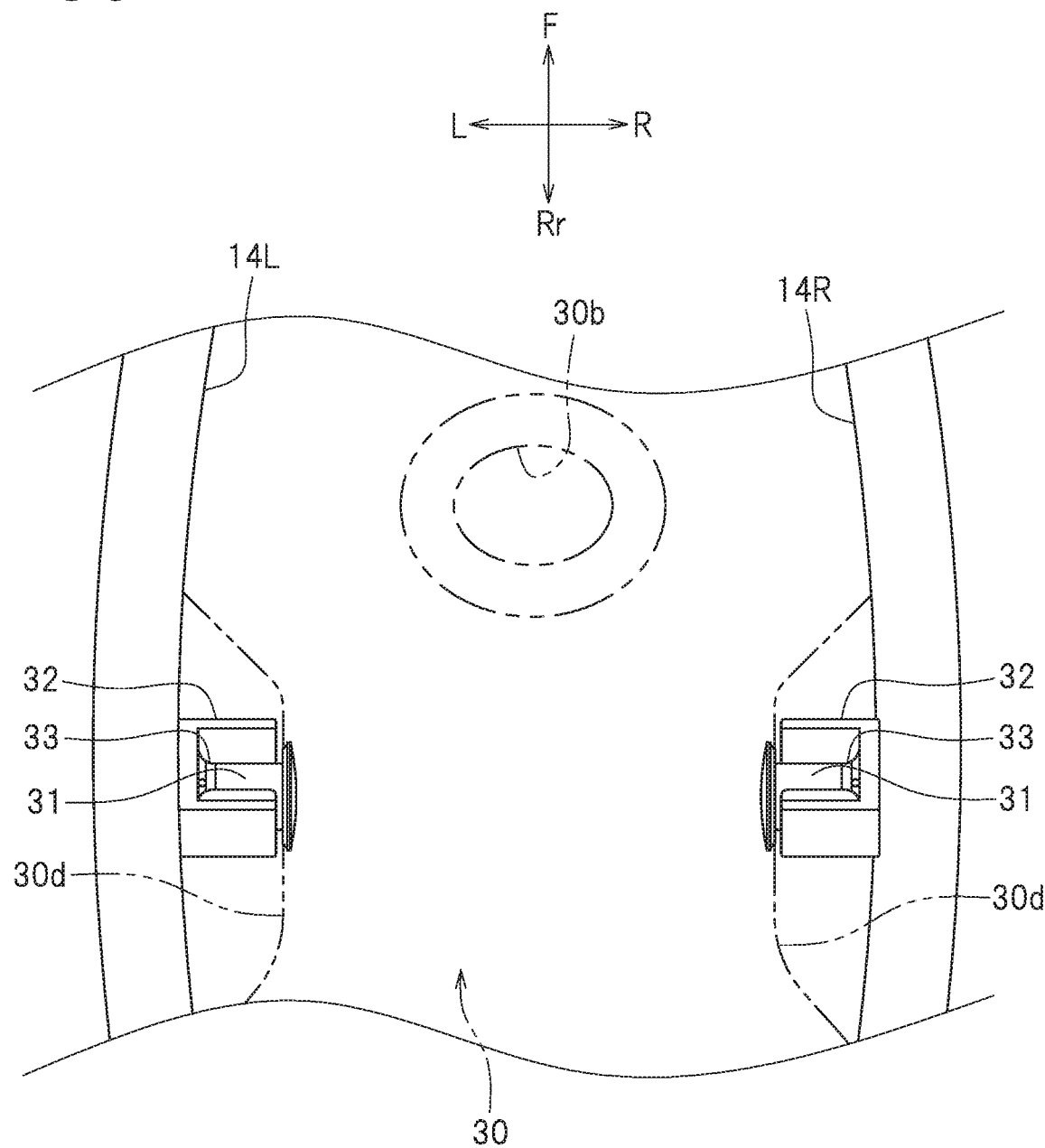
FIG. 9 is a plan view of a main frame, a protruding member and a rubber bracket.
Figure 10:
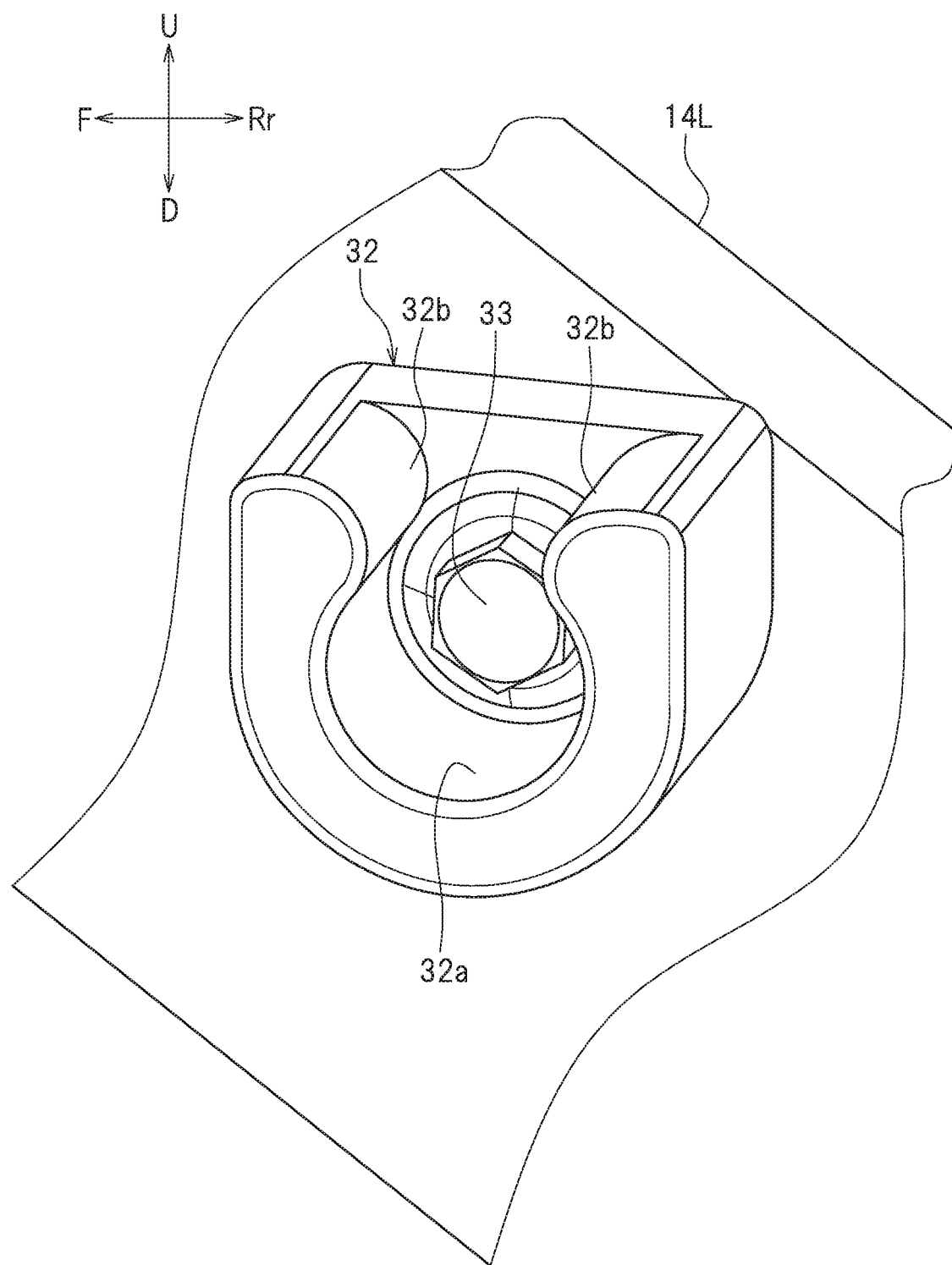
FIG. 10 is a perspective view of the rubber bracket.

As shown in FIG. 9, rubber brackets 32 are attached to the left main frame 14L and the right main frame 14R. The rubber brackets 32 are fastened to the left main frame 14L and the right main frame 14R via bolts 33. Note however that embodiments of the invention are not limited to only the illustrated the attachment of the rubber brackets 32. The rubber brackets 32 are attached to the inner surfaces in the vehicle width direction of the left main frame 14L and the right main frame 14R. As shown in FIG. 6, the left main frame 14L and the rubber bracket 32 are laid on each other, as the vehicle is seen from the side. The right main frame 14R and the rubber bracket 32 are laid on each other, as the vehicle is seen from the side. As shown in FIG. 10, the rubber brackets 32 are formed in a concave shape that is open upward. Also, the rubber brackets 32 are open on the inner side thereof in the vehicle width direction.

As shown in FIG. 8 and FIG. 9, the rubber brackets 32 are configured to engage with the protruding members 31 of the fuel tank 30. When the protruding members 31 are pushed into the rubber brackets 32 in the downward direction, the protruding members 31 are fitted into the rubber brackets 32. The protruding members 31 can be fitted into the rubber brackets 32 simply by pushing down the fuel tank 30 from above. Thus, the front portion of the fuel tank 30 is supported on the main frames 14L and 14R via the protruding members 31 and the rubber brackets 32. As shown in FIG. 10, the rubber bracket 32 includes a supporting portion 32a that supports the protruding member 31, and a pair of, front and rear, barb portions 32b located above the supporting portion 32a. The front barb portion 32b bulges rearward while extending upward, and the rear barb portion 32b bulges forward while extending upward. The barb portions 32b are formed so that the interval therebetween narrows while extending upward. Therefore, once the protruding member 31 is supported on the supporting portion 32a, the protruding member 31 is unlikely to come off the rubber bracket 32.

As shown in FIG. 7, a bracket 45 is secured on a portion of the fuel tank 30 that is rearward of the middle of the fuel tank 30 in the vehicle front-rear direction. The bracket 45 is an example of a fastened portion of the fuel tank 30. The bracket 45 is fastened to the vehicle body frame 3 via a bolt 46. Herein, the bracket 45 is fastened to the rear cross frame 44 via the bolt 46. A rear end 30r of the fuel tank 30 is located rearward of a front end 44f of the rear cross frame 44. A portion of the fuel tank 30 overlaps with the rear cross frame 44, as the vehicle is seen from above (see FIG. 3).

The seat 8 is placed over the fuel tank 30. At least a portion of the seat 8 is supported on the fuel tank 30. The seat 8 includes a main seat 8A, and a sub-seat 8B placed forward of the main seat 8A. The front end of the main seat 8A and the front end of the sub-seat 8B are located forward of the middle position of the fuel tank 30 in the vehicle front-rear direction. A front end 8f of the sub-seat 8B is the front end of the seat 8. The front end 8f of the seat 8 is located forward of the middle position of the fuel tank 30 in the vehicle front-rear direction. The front end 8f of the seat 8 is located forward of a front end 30f of the fuel tank 30 in the vehicle front-rear direction. Note however that the placement of the seat 8 is illustrative, and embodiments of the invention are not limited to the illustrated placement of the seat.

An air cleaner 40 is placed forward of the fuel tank 30. The fuel tank 30 is placed near the air cleaner 40. The minimum interval G1 between the fuel tank 30 and the air cleaner 40 in the vehicle front-rear direction is smaller than the dimension T1 of the rubber bracket 32 in the vehicle front-rear direction. A battery 47 is placed rearward of the fuel tank 30. The fuel tank 30 is placed near the battery 47. The minimum interval G2 between the fuel tank 30 and the battery 47 in the vehicle front-rear direction is smaller than the dimension T1 of the rubber bracket 32 in the vehicle front-rear direction.

The air cleaner 40 is placed rearward of the head pipe 2. The air cleaner 40 includes an upper case 41, a lower case 42 placed below the upper case 41, and an air cleaner element 43 provided between the upper case 41 and the lower case 42. The air cleaner 40 is configured so that the air introduced into the upper case 41 is cleaned while passing through the air cleaner element 43, and the cleaned air is supplied to the lower case 42. An intake pipe 49, provided with a throttle body (not shown), etc., is connected to the lower portion of the lower case 42. The intake pipe 49 connects between the air cleaner 40 and the internal combustion engine of the engine unit 4.

As shown in FIG. 1, the motorcycle 1 includes a left and a right side cover 50. The left and right side covers 50 are placed leftward and rightward of the vehicle center line CL, respectively. The left side cover 50 and the right side cover 50 may be placed in left-right symmetry, or left-right asymmetry, with each other with respect to a vertical plane containing the vehicle center line CL. The shape of the left side cover 50 and the right side cover 50 may be in left-right symmetry, or left-right asymmetry, with each other with respect to a vertical plane containing the vehicle center line CL. For example, the shape of the surface-side portion (in other words, the outer portion in the vehicle width direction) of the left side cover 50 and the right side cover 50 may be in left-right symmetry while the shape of the reverse-side portion (in other words, the inner portion in the vehicle width direction) may be in left-right asymmetry. The shape of the left side cover 50 and the right side cover 50 may be in left-right symmetry at least with respect to a duct formation portion 50d to be described below. The left side cover 50 will be described below and the description of the right side cover 50 will be omitted.

Figure 11:
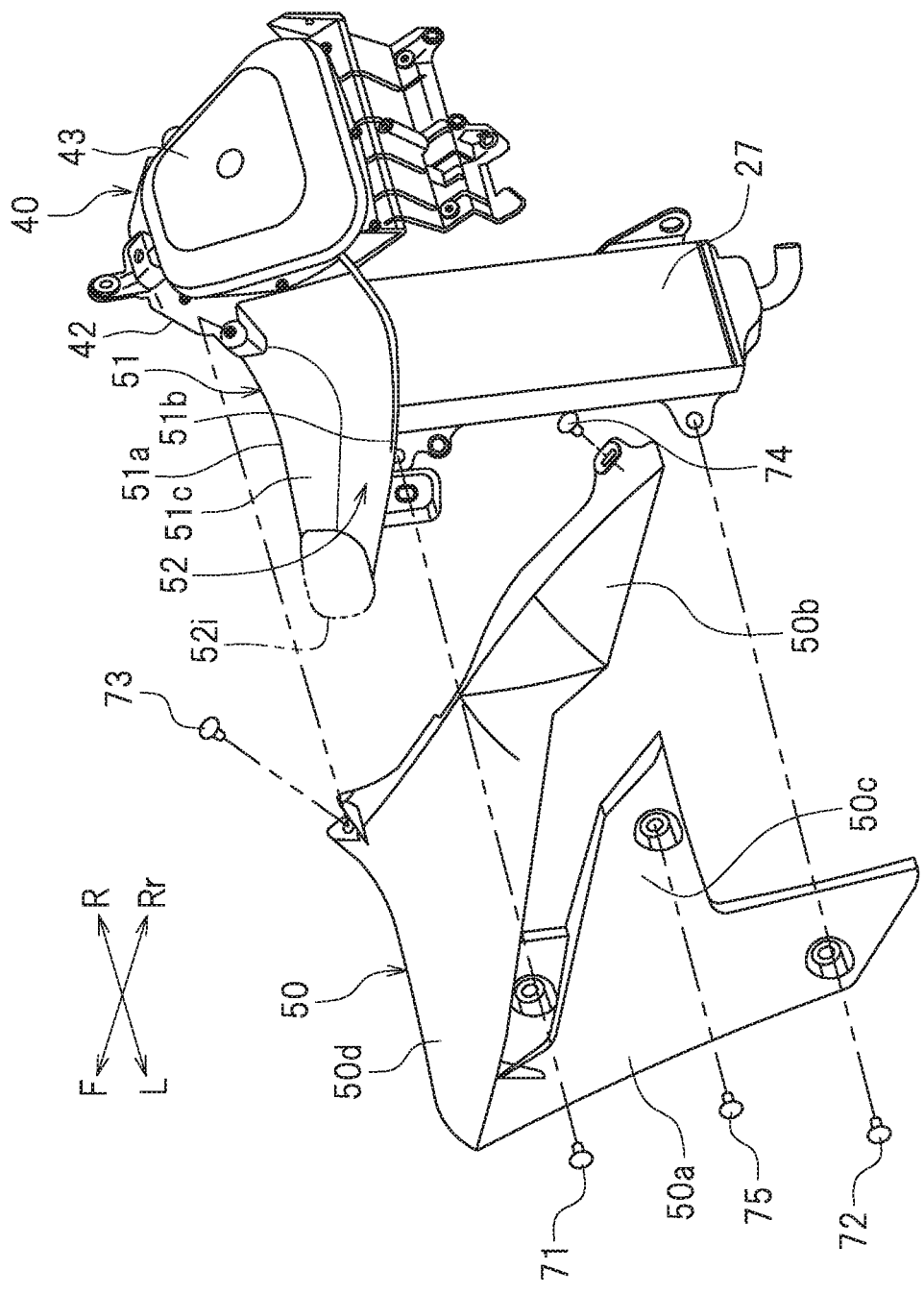
FIG. 11 is an exploded perspective view of a portion of a side cover, a duct part and an air cleaner, and a radiator.

While the side cover 50 may be composed of a plurality of parts, it is in the present embodiment an integral large cover to be assembled onto other members, as shown in FIG. 11. The side cover 50 is a single, integral part. As shown in FIG. 1, a portion of the side cover 50 is placed below the cylinder head cover 23 of the engine unit 4. A portion of the side cover 50 is placed below the cylinder head 22 of the engine unit 4. The side cover 50 includes a radiator cover portion 50a placed outward of the radiator 27 in the vehicle width direction, a tank cover portion 50b placed outward of the fuel tank 30 in the vehicle width direction, and a rearward portion 50c placed outward of at least a portion of the intake pipe 49 in the vehicle width direction. The side cover 50 includes the duct formation portion 50d placed forward of the tank cover portion 50b. The duct formation portion 50d is located above the radiator cover portion 50a and the rearward portion 50c.

While embodiments of the invention are not limited to any particular material of the side cover 50, according to one embodiment, it is made of a resin. Likewise, while embodiments of the invention are not limited to any one method for manufacturing the side cover 50, according to one embodiment, it is manufactured by injection molding. According to one embodiment, the side cover 50 is an injection-molded part.

As shown in FIG. 11, a duct part 51 extending forward in the vehicle front-rear direction from the lower case 42 is formed integrally with the lower case 42 of the air cleaner 40. A pair of, left and right, duct parts 51 are provided. The lower case 42 and the duct parts 51 are made of a resin, and are formed integrally together.

Figure 12:
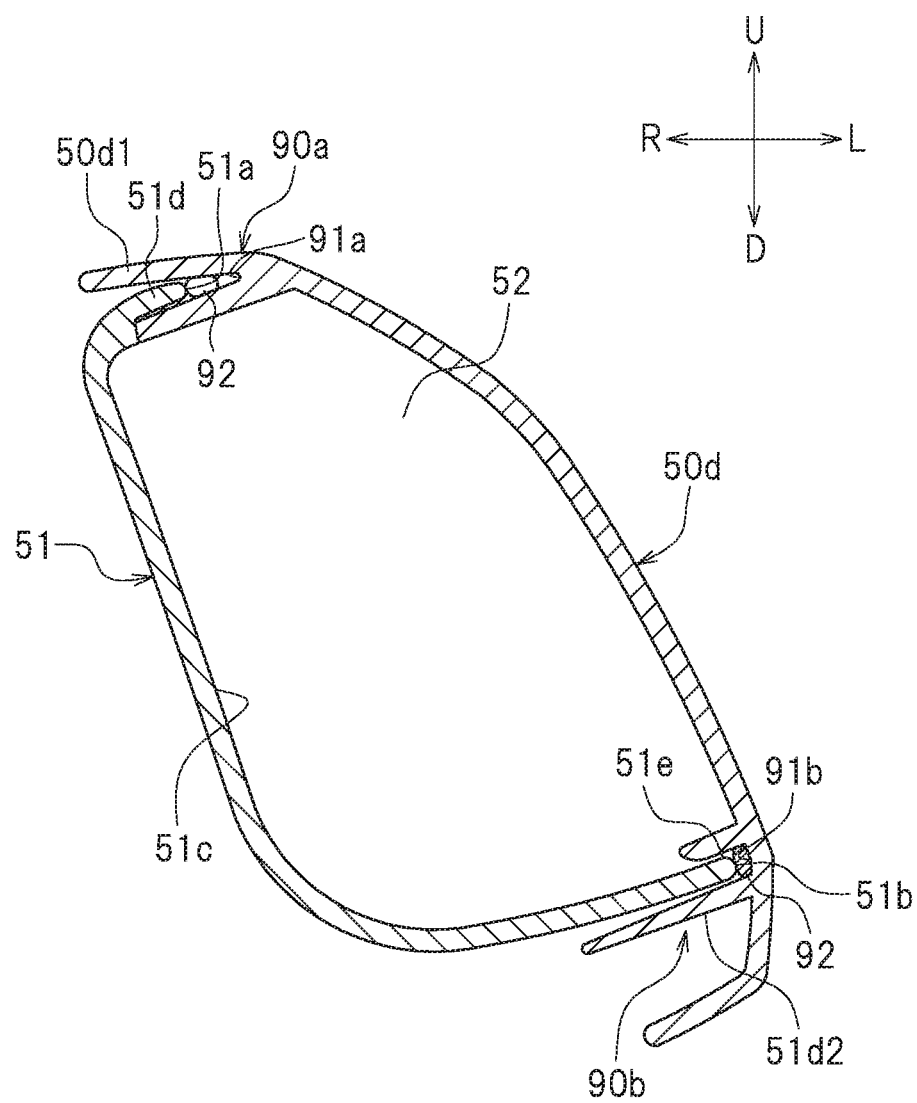
FIG. 12 is a cross-sectional view taken along line K-K of FIG. 1, showing the side cover and the duct part.

FIG. 12 is a cross-sectional view taken along line K-K of FIG. 1, showing the side cover 50 and the duct part 51. The duct part 51 is assembled onto the duct formation portion 50*d* of the side cover 50, thereby defining a duct 52 connected to the internal space between the upper case 41 and the air cleaner element 43 in the air cleaner 40.

Figure 14:
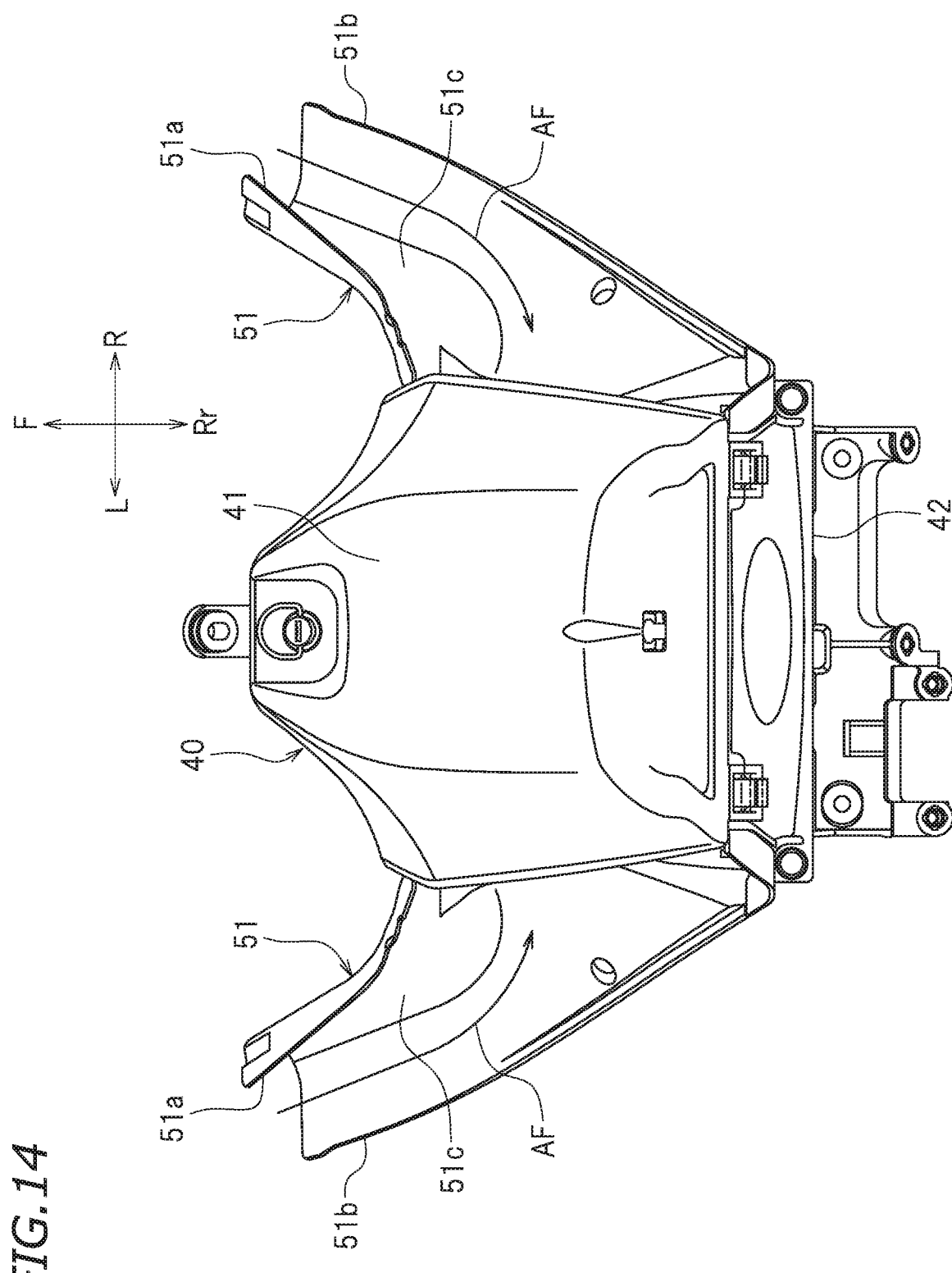
FIG. 14 is a plan view of the air cleaner and the duct part.
Figure 15:
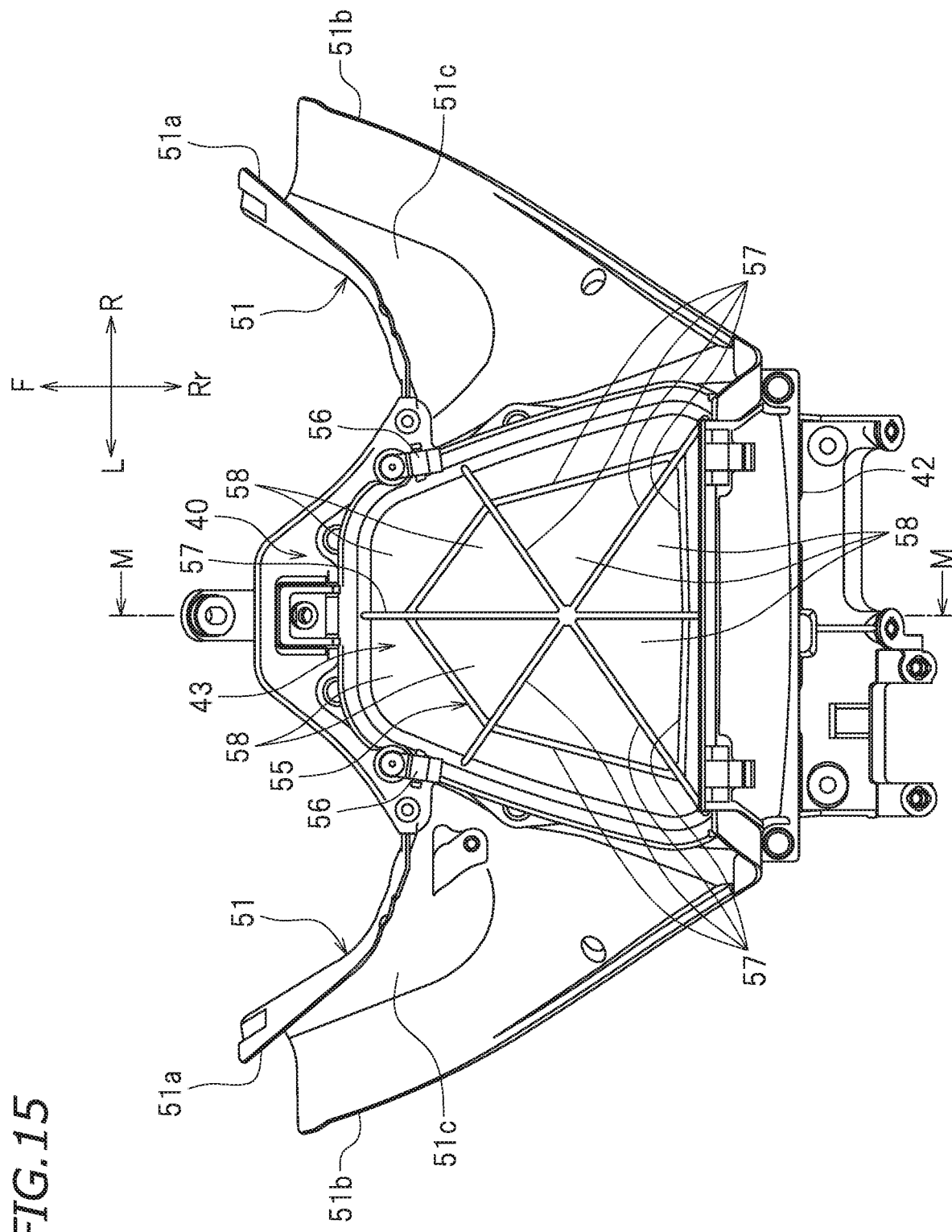
FIG. 15 is a plan view of the air cleaner and the duct part, with an upper case removed.

As shown in FIG. 14 and FIG. 15, the duct part 51 includes an upper edge 51*a* extending in the vehicle front-rear direction, a lower edge 51*b* extending in the vehicle front-rear direction and located below the upper edge 51*a*, and an inner wall 51*c* located between the upper edge 51*a* and the lower edge 51*b* and depressed inward in the vehicle width direction. As shown in FIG. 12, the duct formation portion 50*d* of the side cover 50 includes an upper C-shaped-section portion 90*a* and a lower C-shaped-section portion 90*b*. Grooves 91*a* and 91*b* are formed in the C-shaped-section portions 90*a* and 90*b*, respectively. The upper edge 51*a* of the duct part 51 is fitted into the groove 91*a*, and the lower edge 51*b* is fitted into the groove 91*b*. Note that reference sign 92 is a sealant. An upper portion 51*d* of the duct part 51 and an upper portion 50*d*1 of the duct formation portion 50*d* are stacked on each other. A lower portion 51*e* of the duct part 51 and a lower portion 51*d*2 of the duct formation portion 50*d* are stacked on each other. The lower edge 51*b* of the duct part 51 is located outward of the upper edge 51*a* in the vehicle width direction.

Figure 13:
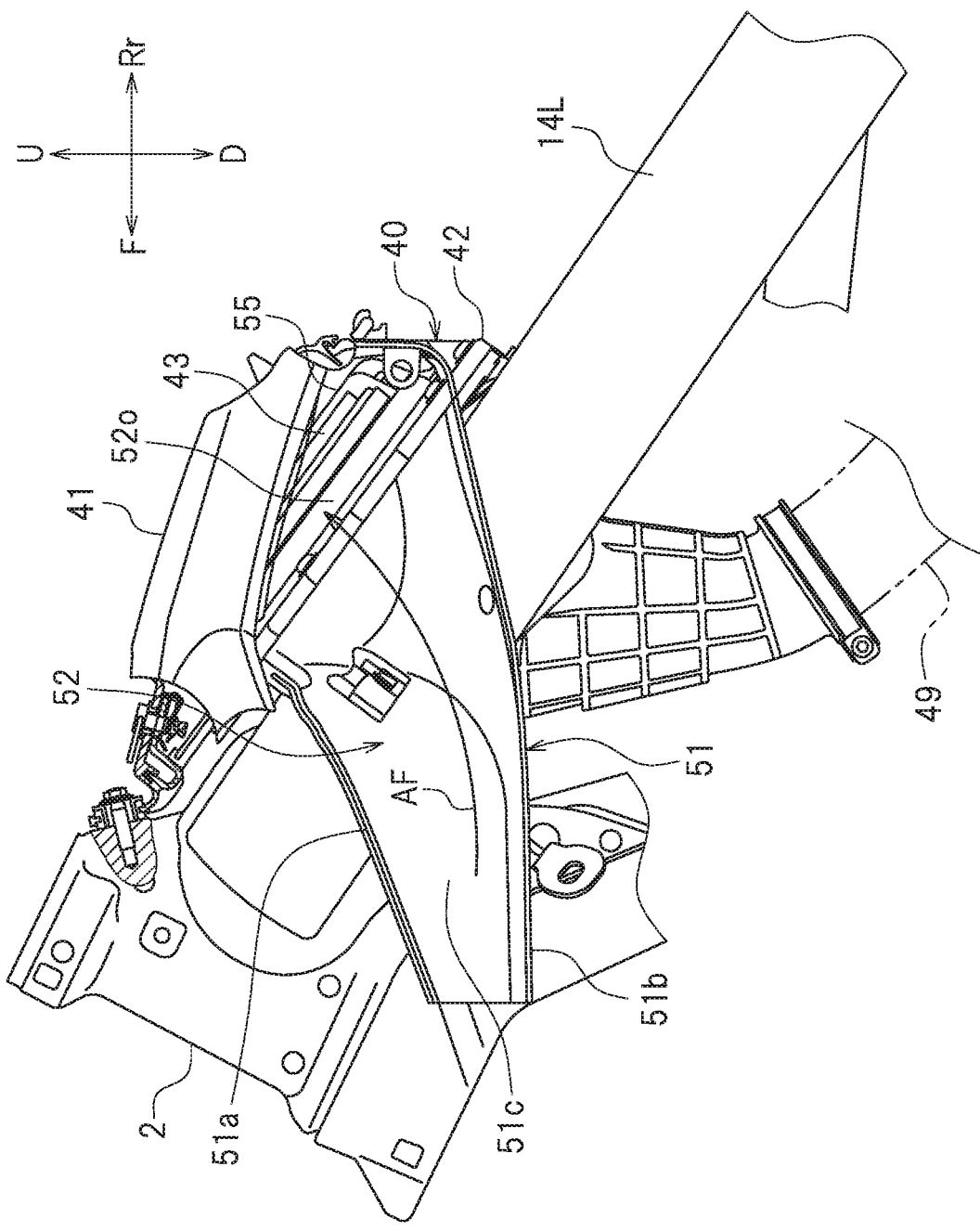
FIG. 13 is a side view of the air cleaner and the duct part.

An air inlet 52*i* that is open in the forward direction or in the inner direction of the vehicle width direction is formed at the front end of the duct 52 (see FIG. 11). The air inlet 52*i* is partitioned by the duct formation portion 50*d* of the side cover 50 and the duct part 51. The air is introduced into the duct 52 through the air inlet 52*i*. FIG. 13 is a side view of the air cleaner 40 and the duct part 51. As shown in FIG. 13, an air outlet 52*o* is formed at the rear end of the duct 52. The air outlet 52*o* is open toward the internal space between the upper case 41 and the air cleaner element 43 of the air cleaner 40. Note that the arrow AF in the figure represents the air flow.

Figure 16:
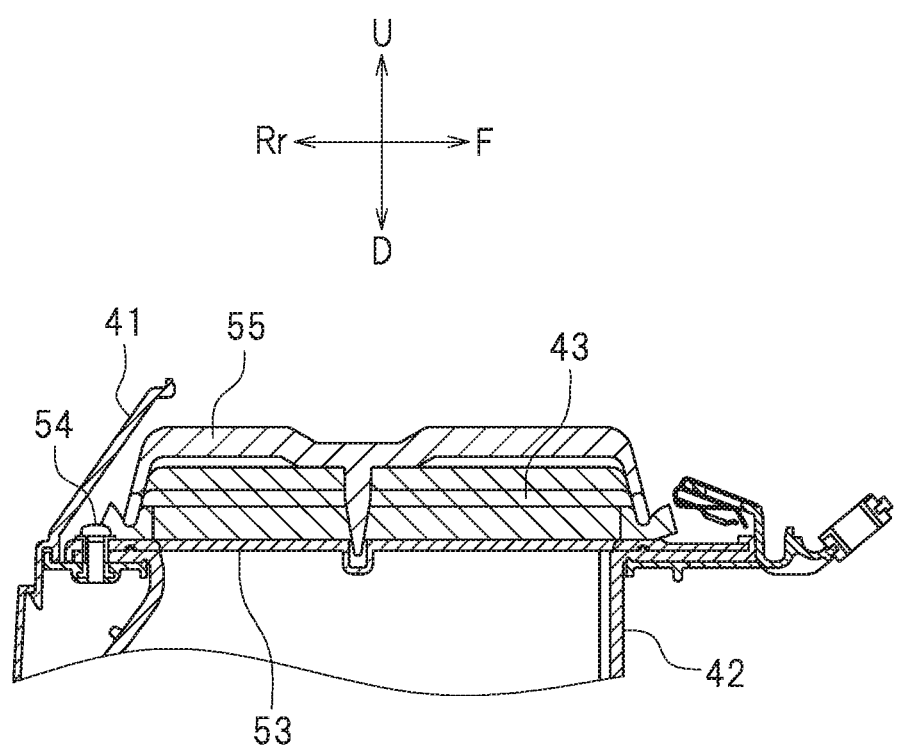
FIG. 16 is a cross-sectional view taken along line M-M of FIG. 15.
Figure 17:
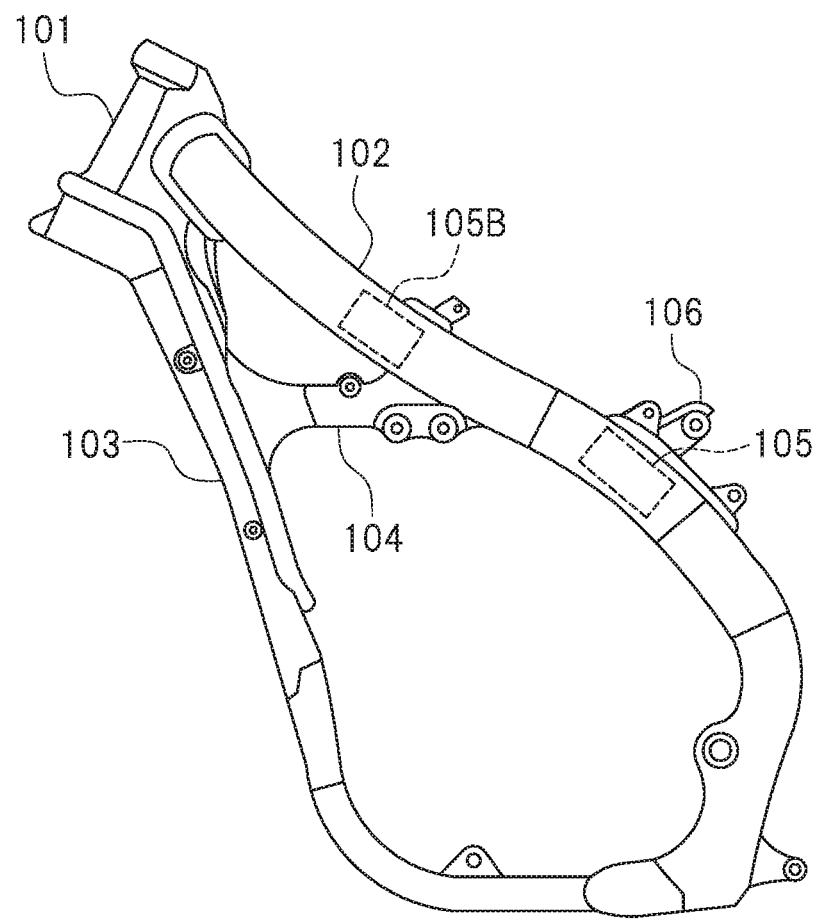
FIG. 17 is a side view of a vehicle body frame of a conventional motorcycle.

FIG. 14 is a plan view of a portion of the air cleaner 40 and the duct part 51. FIG. 15 is a plan view of a portion of the air cleaner 40 and the duct part 51, with the upper case 41 removed. FIG. 16 is a cross-sectional view taken along line M-M of FIG. 15. As shown in FIG. 16, a holder 53 is fastened to the lower case 42 via a bolt 54. The air cleaner element 43 is placed on the holder 53, and a holder 55 is placed on the air cleaner element 43. As shown in FIG. 15, the holder 53 and the holder 55 each include a plurality of linear members 57. The holder 53 and the holder 55 are formed in a lattice pattern. Air paths 58, through which the air passes, are formed between the linear members 57. A portion of the holder 55 is inserted into the central portion of the holder 53 (see FIG. 16). The holder 55 is held down by a plate material 56. The holder 55 and the holder 53 are assembled together, as described above, with the air cleaner element 43 sandwiched between the holder 55 and the holder 53 (see FIG. 16). Thus, the air cleaner element 43 is held between the upper case 41 and the lower case 42.

As shown in FIG. 11, the side cover 50, the duct part 51 and the radiator 27 are assembled together via a bolt 71. The lower portion of the side cover 50 and the lower portion of the radiator 27 are assembled together via a bolt 72. The side cover 50 and the vehicle body frame 3 (not shown in FIG. 11) are assembled together via a bolt 75. The bolts 71, 72 and 75 are fastened from the side. A portion of the side cover 50 and a portion of the lower case 42 are laid on each other and are fastened together via a bolt 73. The tank cover portion 50*b* of the side cover 50 and the fuel tank 30 (not shown in FIG. 11) are fastened together via a bolt 74. The bolt 73 and the bolt 74 are fastened from above. Note that while bolts 71 to 75 are an example fastener, the fastener is not limited to bolts. The fastener may be screws, or the like.

As described above, with the motorcycle 1 according to the present embodiment, as shown in FIG. 2, as the vehicle is seen from the side, the centroid 18P of the cross frame 18 is located within an area that is delimited by the upper extension 17*r* obtained by extending rearward the upper outline 17*p* of the left connecting frame 17L, the lower extension 17*s* obtained by extending rearward the lower outline 17*q* of the left connecting frame 17L, the upper outline 14*p* of the left main frame 14L and the lower outline 14*q* of the left main frame 14L. Moreover, the centroid 18P is located within an area that is delimited by the upper extension 17*r* obtained by extending rearward the upper outline 17*p* of the right connecting frame 17R, the lower extension 17*s* obtained by extending rearward the lower outline 17*q* of the right connecting frame 17R, the upper outline 14*p* of the right main frame 14R and the lower outline 14*q* of the right main frame 14R. As the cross frame 18 is placed as described above, the position of the upper end portion 60*a* of the rear cushion unit 60 is kept at a relatively high position, and a distance is ensured between the head pipe 2 and the cross frame 18. Therefore, the rear cushion unit 60 does not need to be installed in an attitude that is substantially inclined from the vertical line, and the upward force that is received from the road surface by the rear wheel 7 is likely to be absorbed directly by the rear cushion unit 60. When a shock is applied onto the head pipe 2 from the front, there is likely to be a shock absorbing effect from the left main frame 14L and the right main frame 14R being bent left and right. Therefore, even when running fast on a bad road, it is possible to reduce the amount of energy in the pitching direction from the road surface to be transmitted to the rider and to increase the amount of time over which the tires 6*a* and 7*a* are in contact with the road surface.

In the present embodiment, as the vehicle is seen from the side, the distance L3 between the intersection point 17*n* between the upper extension 17*r* of the left connecting frame 17L and the central line 14*j* of the left main frame 14L and the central axis 2*c* of the head pipe 2 is 0.8 to 1.0 time the distance L1 between the central axis 2*c* of the head pipe 2 and the centroid 18P of the cross frame 18. As the vehicle is seen from the side, the distance L3 between the intersection point 17*n* between the upper extension 17*r* of the right connecting frame 17R and the central line 14*j* of the right main frame 14R and the central axis 2*c* of the head pipe 2 is 0.8 to 1.0 time L1. According to the present embodiment, L3 is twice or more L2. Thus, with the motorcycle 1 according to the present embodiment, the distance between the head pipe 2 and the connecting portion between the left main frame 14L and the left connecting frame 17L is relatively long. The distance between the head pipe 2 and the connecting point between the right main frame 14R and the right connecting frame 17R is relatively long. Therefore, when a shock is applied onto the head pipe 2 from the front, it is possible to sufficiently realize a shock absorbing effect from the left main frame 14L and the right main frame 14R being bent. Therefore, it is possible to sufficiently reduce the amount of energy in the pitching direction from the road surface to be transmitted to the rider.

The left main frame 14L and the right main frame 14R include the first portions 14*b*1 and 14*f*1 that deviate outward in the vehicle width direction while extending rearward from the head pipe 2, as the vehicle is seen from above, and the second portions 14b2 and 14f2 that deviate inward in the vehicle width direction while extending rearward from the first portions 14b1 and 14f1, as the vehicle is seen from above. When a shock is applied onto the head pipe 2 from the front, the first portions 14b1 and 14f1 are more easily bent than the second portions 14b2 and 14f2. Therefore, the first portions 14b1 and 14f1 are more likely to exert a shock absorbing effect from being bent than the second portions 14b2 and 14f2. With the motorcycle 1 according to the present embodiment, the cross frame 18 is connected to the second portions 14b2 and 14f2, and the first portions 14b1 and 14f1 are not bound by the cross frame 18. Therefore, it is possible to sufficiently realize a shock absorbing effect, and it is possible to sufficiently reduce the amount of energy in the pitching direction from the road surface to be transmitted to the rider.

With the motorcycle 1 according to the present embodiment, the pivotal point 60b of the upper end portion 60a of the rear cushion unit 60 is located within an area between the upper extension 17r obtained by extending rearward the upper outline 17p of the left connecting frame 17L and the lower extension 17s obtained by extending rearward the lower outline 17q of the left connecting frame 17L, as the vehicle is seen from the side. Moreover, the pivotal point 60b is located within an area between the upper extension 17r obtained by extending rearward the upper outline 17p of the right connecting frame 17R and the lower extension 17s obtained by extending rearward the lower outline 17q of the right connecting frame 17R, as the vehicle is seen from the side. Thus, with the motorcycle 1 according to the present embodiment, the position of the upper end portion 60a of the rear cushion unit 60 is relatively high. Therefore, the rear cushion unit 60 does not need to be installed in an attitude that is substantially inclined from the vertical line, and the upward force that is received from the road surface by the rear wheel 7 is likely to be absorbed directly by the rear cushion unit 60. Therefore, it is possible to increase the amount of time over which the tire 7a is in contact with the road surface.

With the motorcycle 1 according to the present embodiment, the left connecting frame 17L and the right connecting frame 17R are located at a relatively high position such that they partially overlap with the cylinder head cover 11. Since the cross frame 18 is placed so that the centroid 18P is located within the area described above, the cross frame 18 is located at a preferred position such that the upper end portion 60a of the rear cushion unit 60 is located at a relatively high position.

With the motorcycle 1 according to the present embodiment, as the vehicle is seen from the side, the point of attachment 19a of the seat frame 19A is located above the upper extension 17r of the left connecting frame 17L and the upper extension 17r of the right connecting frame 17R. With such a placement, it is possible to preferably support the seat frame 19A on the cross frame 18 while simultaneously realizing the effect that the rear cushion unit 60 directly absorbs the upward force received from the road surface by the rear wheel 7 and realizing the shock absorbing effect due to the left main frame 14L and the right main frame 14R being bent when a shock is applied onto the head pipe 2 from the front.

Note that in the present embodiment, the centroid 18P is defined as the centroid of the central cross section 18K in the vehicle width direction of the main frame 18. However, when the position of the center in the vehicle width direction of the main frame 18 is shifted from the vehicle center line CL, the centroid of a vertical section that contains the vehicle center line CL of the main frame 18 can be regarded as the centroid 18P, instead of the centroid of the central cross section 18K in the vehicle width direction of the main frame 18. The various positional relationships described above with the present motorcycle may hold true for the centroid 18P so defined.

A motorcycle has been described in the embodiment described above as an example straddled vehicle. However, a straddled vehicle is not limited to a motorcycle. It may be any other straddled vehicle such as a three-wheeled vehicle and an all terrain vehicle (ATV).

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A straddled vehicle comprising:
    a head pipe;
    a left main frame placed leftward of a vehicle center line, the left main frame including a first connecting portion connected to the head pipe, a first front-rear extending portion extending rearward from the first connecting portion, and a first up-down extending portion extending downward from a rear end of the first front-rear extending portion;
    a right main frame placed rightward of the vehicle center line, the right main frame including a second connecting portion connected to the head pipe, a second front-rear extending portion extending rearward from the second connecting portion, and a second up-down extending portion extending downward from a rear end of the second front-rear extending portion;
    a down frame including a third connecting portion connected to a portion of the head pipe that is below the first connecting portion and the second connecting portion, and a third up-down extending portion extending downward from the third connecting portion;
    a left lower frame connected to a lower end of the third up-down extending portion of the down frame and a lower end of the first up-down extending portion of the left main frame;
    a right lower frame connected to a lower end of the third up-down extending portion of the down frame and a lower end of the second up-down extending portion of the right main frame;

a left connecting frame including a front end portion connected to the down frame and a rear end portion connected to the first front-rear extending portion of the left main frame;

a right connecting frame including a front end portion connected to the down frame and a rear end portion connected to the second front-rear extending portion of the right main frame;

a cross frame connected to the left main frame and the right main frame; and a rear cushion unit including an upper end portion pivotally supported on the cross frame, wherein as the vehicle is seen from the side, a centroid of a central cross section in a vehicle width direction of the cross frame is located within an area that is delimited by an upper extension obtained by extending rearward an upper outline of the left connecting frame, a lower extension obtained by extending rearward a lower outline of the left connecting frame, an upper outline of the left main frame and a lower outline of the left main frame, and is located within an area that is delimited by an upper extension obtained by extending rearward an upper outline of the right connecting frame, a lower extension obtained by extending rearward a lower outline of the right connecting frame, an upper outline of the right main frame, and a lower outline of the right main frame, and wherein the left and right connecting frames are connected to the down frame closer to the third connecting portion than to a point where the down frame connects to the left and right lower frames.

2. The straddled vehicle according to claim 1, wherein $0.8 \times L1 \leq L3 \leq 1.0 \times L1$, where:

L1 is a distance between a central axis of the head pipe and the centroid of the cross frame; and L3 is a distance between the central axis of the head pipe and an intersection point between the upper extension of the left connecting frame and a center line of the left main frame, as the vehicle is seen from the side, or a distance between the central axis of the head pipe and an intersection point between the upper extension of the right connecting frame and a center line of the right main frame, as the vehicle is seen from the side.

3. The straddled vehicle according to claim 1, wherein $L3 \geq 2 \times L2$, where:

L2 is a length dimension of the head pipe in a central axis direction; and

L3 is a distance between a central axis of the head pipe and an intersection point between the upper extension of the left connecting frame and a center line of the left main frame, as the vehicle is seen from the side, or a distance between the central axis of the head pipe and an intersection point between the upper extension of the right connecting frame and a center line of the right main frame, as the vehicle is seen from the side.

4. The straddled vehicle according to claim 1, wherein:

the left main frame and the right main frame each include a first portion that deviates outward in a vehicle width direction while extending rearward from the head pipe, as the vehicle is seen from above, and a second portion that deviates inward in the vehicle width direction while extending rearward from the first portion, as the vehicle is seen from above; and at least a portion of the cross frame is connected to the second portion of the left main frame and the second portion of the right main frame.

5. The straddled vehicle according to claim 1, wherein as the vehicle is seen from the side, a pivotal point of the upper end portion of the rear cushion unit is located within an area between the upper extension obtained by extending rearward the upper outline of the left connecting frame and the lower extension obtained by extending rearward the lower outline of the left connecting frame, and is located within an area between the upper extension obtained by extending rearward the upper outline of the right connecting frame and the lower extension obtained by extending rearward the lower outline of the right connecting frame.

6. The straddled vehicle according to claim 1, comprising:

an engine unit including a crankcase, a cylinder body connected to the crankcase, a cylinder head connected to the cylinder body, and a cylinder head cover connected to the cylinder head, wherein the engine unit is suspended on the left main frame, the right main frame and the down frame, wherein the left connecting frame and the cylinder head cover partially overlap with each other and the right connecting frame and the cylinder head cover partially overlap with each other, as the vehicle is seen from the side.

7. The straddled vehicle according to claim 1, comprising a seat frame attached to the cross frame and extending rearward from the cross frame, wherein as the vehicle is seen from the side, a point at which the seat frame is attached to the cross frame is located above the upper extension of the left connecting frame and the upper extension of the right connecting frame.

8. The straddled vehicle according to claim 1, wherein the rear cushion unit is connected to an arm for rotatably supporting a rear tire, such that the rear cushion unit cushions a force received from the rear tire.

9. The straddled vehicle according to claim 1, wherein the left connecting frame and the right connecting frame are ends of a single U-shaped connecting frame, such that a base of the U-shaped connecting frame is connected to the down frame.

10. The straddled vehicle according to claim 1, wherein each of the left connecting frame and the right connecting frame is extending rearward and downward as the vehicle is seen from the side.

* * * * *